United States Patent [19]
Ootsuka

[11] Patent Number: 5,532,774
[45] Date of Patent: Jul. 2, 1996

[54] FILM DATA RECORDING/REPRODUCING APPARATUS FOR A CAMERA BY WRITING/READING PITS RECORDED ON A FILM

[75] Inventor: Yasunobu Ootsuka, Tokyo, Japan

[73] Assignee: Olympus Optical Co., Ltd., Tokyo, Japan

[21] Appl. No.: 376,641

[22] Filed: Jan. 20, 1995

Related U.S. Application Data

[63] Continuation of Ser. No. 25,642, Mar. 2, 1993, abandoned.

[30] Foreign Application Priority Data

Mar. 5, 1992 [JP] Japan .................... 4-048771

[51] Int. Cl.⁶ .................................. G03B 17/24
[52] U.S. Cl. ........................................ 354/106
[58] Field of Search ......................... 354/105, 106, 354/109

[56] References Cited

U.S. PATENT DOCUMENTS

| | | | |
|---|---|---|---|
| 3,843,956 | 10/1974 | Kauneckas | 354/108 |
| 4,864,332 | 9/1989 | Harvey | 354/105 X |
| 4,914,471 | 4/1990 | Saeki et al. | 355/40 |
| 5,023,637 | 6/1991 | Lorton et al. | 354/106 |
| 5,128,702 | 7/1992 | Ogawa et al. | 354/106 |
| 5,229,810 | 7/1993 | Cloutier et al. | 354/106 X |

FOREIGN PATENT DOCUMENTS

| | | |
|---|---|---|
| 48-38841 | 5/1973 | Japan . |
| 51-95837 | 8/1976 | Japan . |
| 52-108120 | 9/1977 | Japan . |
| 62-116243 | 7/1987 | Japan . |
| 62-208028 | 9/1987 | Japan . |
| 62-238542 | 10/1987 | Japan . |
| 1-166332 | 11/1989 | Japan . |
| 1-171438 | 12/1989 | Japan . |
| 2-148030 | 6/1990 | Japan . |
| 2-149835 | 6/1990 | Japan . |

*Primary Examiner*—Michael L. Gellner
*Assistant Examiner*—J. K. Han
*Attorney, Agent, or Firm*—Frishauf, Holtz, Goodman, Langer & Chick

[57] ABSTRACT

A thermal head records data on a photographing film in the form of fine pits formed on the surface of the photographing film by its fine heating sections tightly contacted to the photographing film while the photographing film is being moved in a camera. A data detecting optical system projects light on the pits representing data on the surface of the photographing film and receives the light reflected by the photographing film. A line sensor detects rays of light scattered by the pits when the photographing film reflects the projected light, thereby reading out the recorded data.

33 Claims, 33 Drawing Sheets

REGION FOR CORRECTION AND PREHEATING

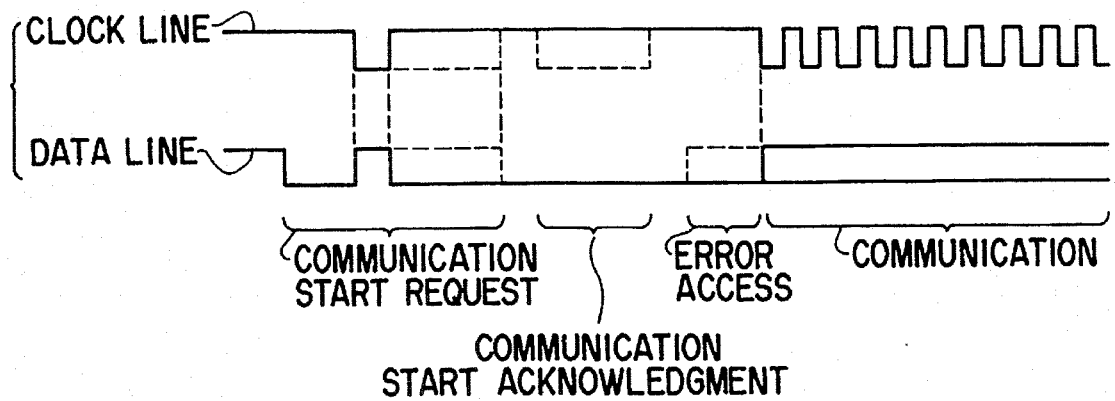
F I G. 15
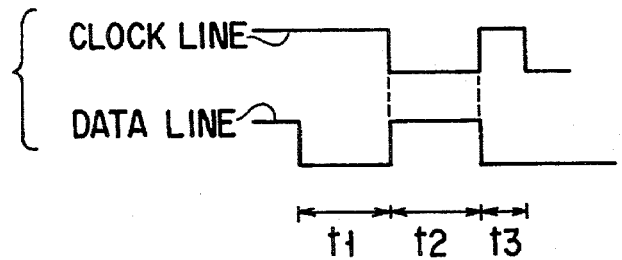
F I G. 16
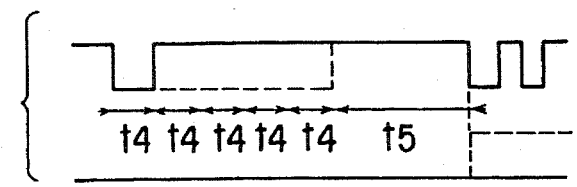
F I G. 17

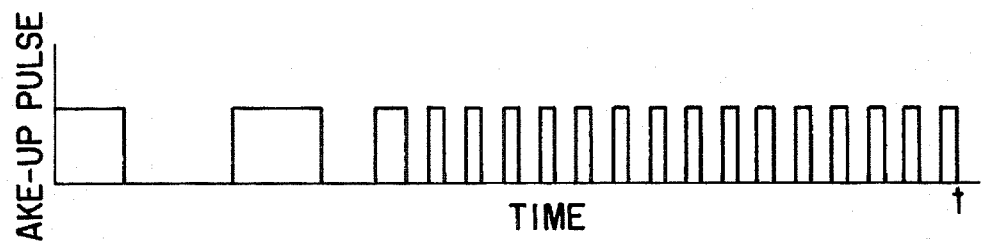
F I G. 27
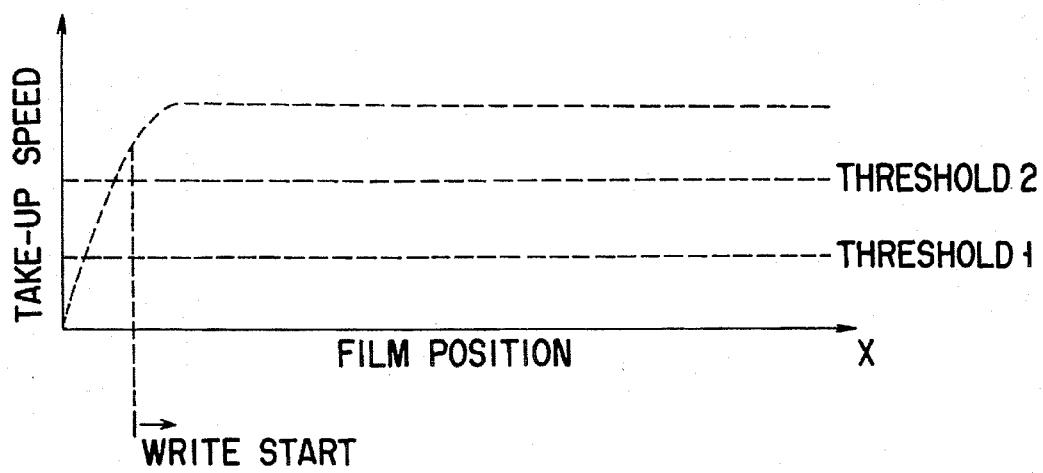
F I G. 28
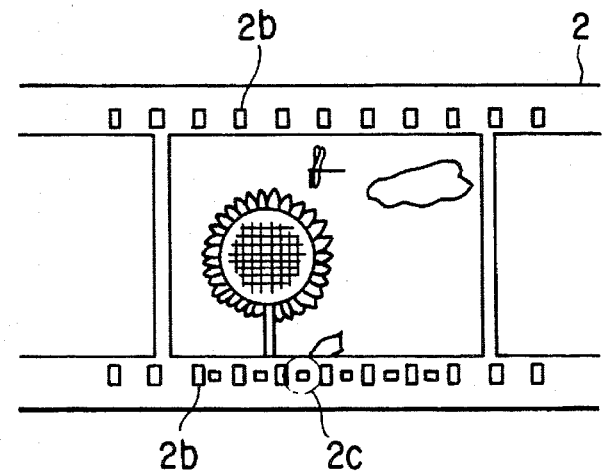
F I G. 29

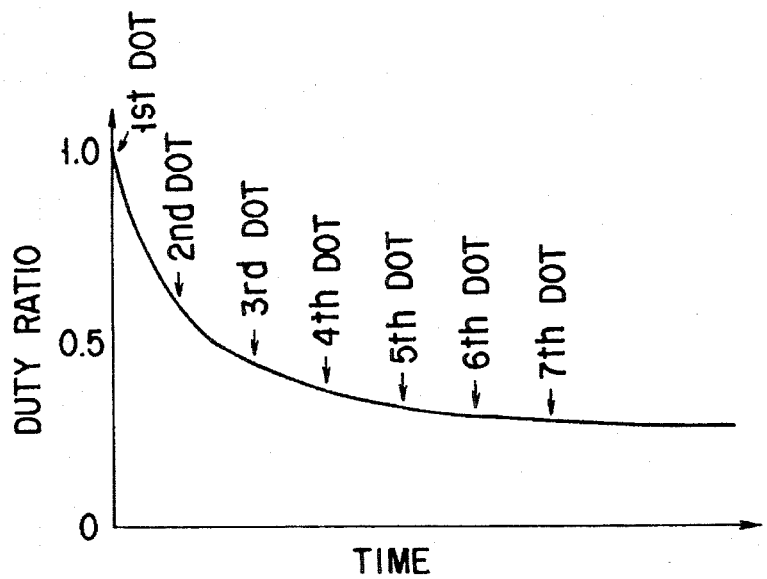
F I G. 33
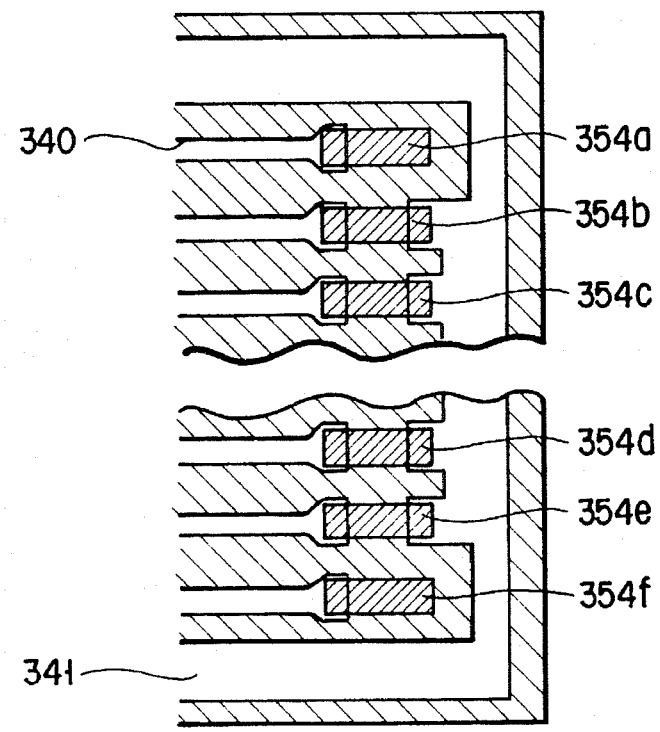
F I G. 34

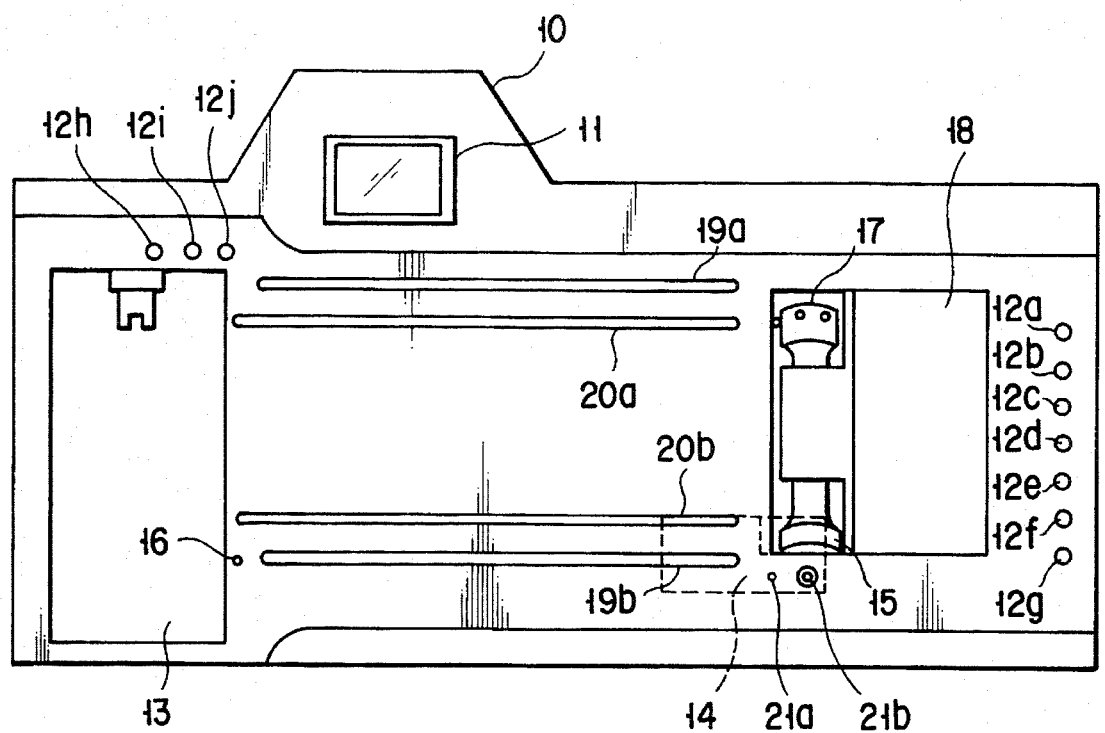
F I G. 37
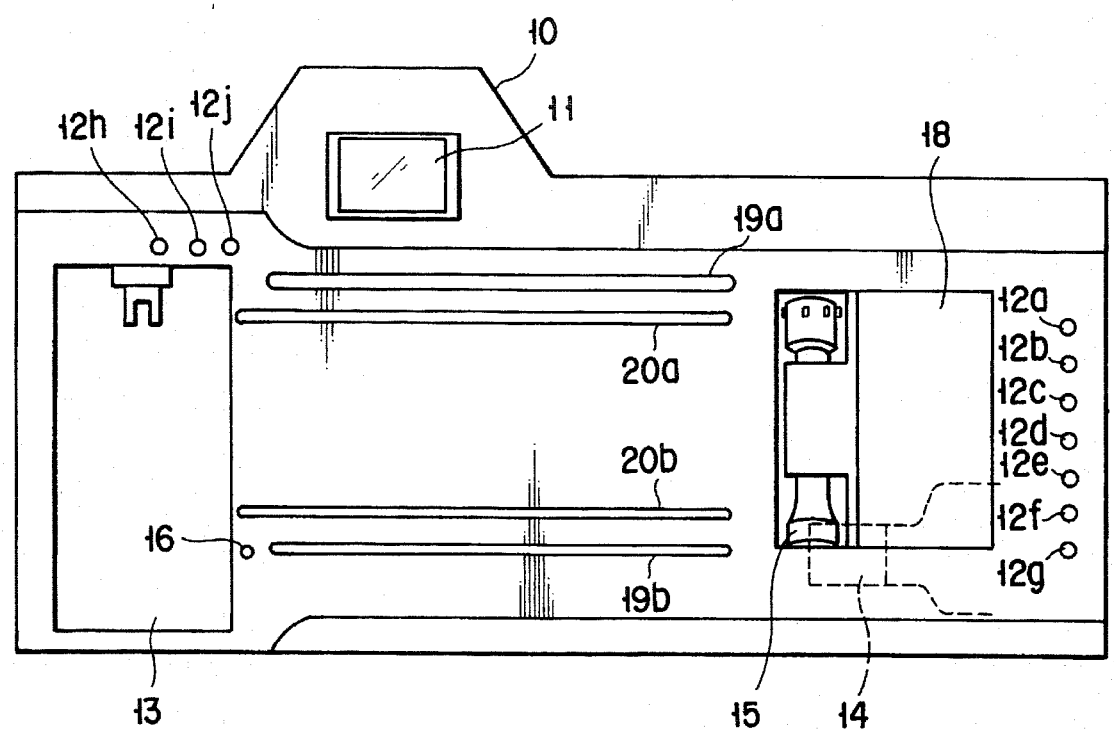
F I G. 38

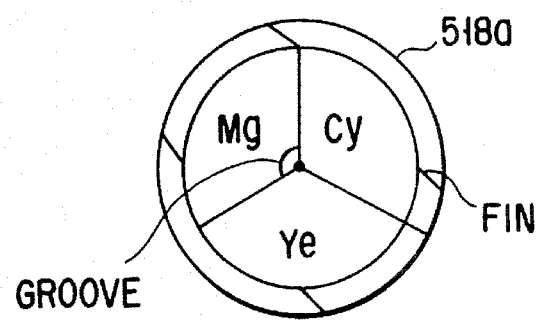
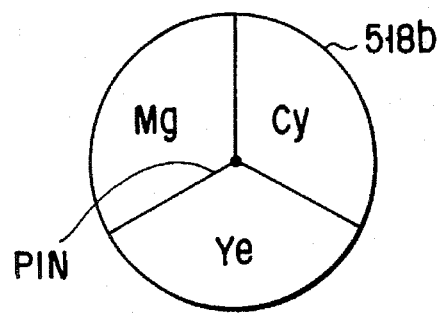
F I G. 42A    F I G. 42B
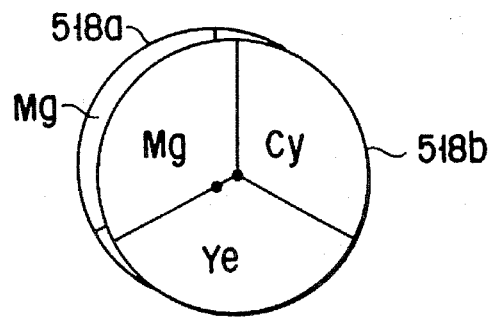
F I G. 43
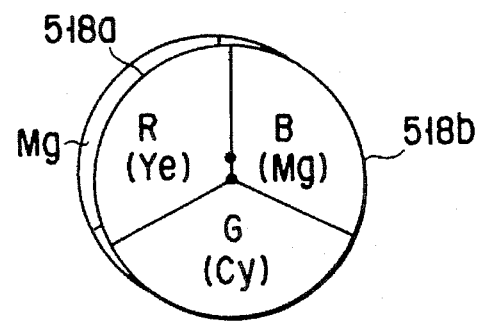
F I G. 44

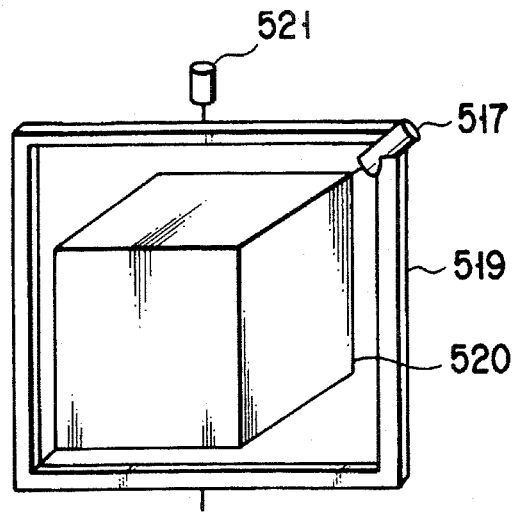
FIG. 45
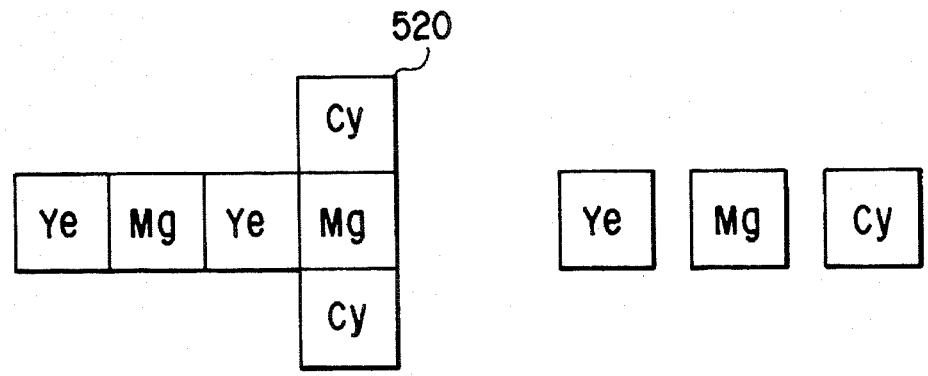
FIG. 46A    FIG. 46B
FIG. 46C

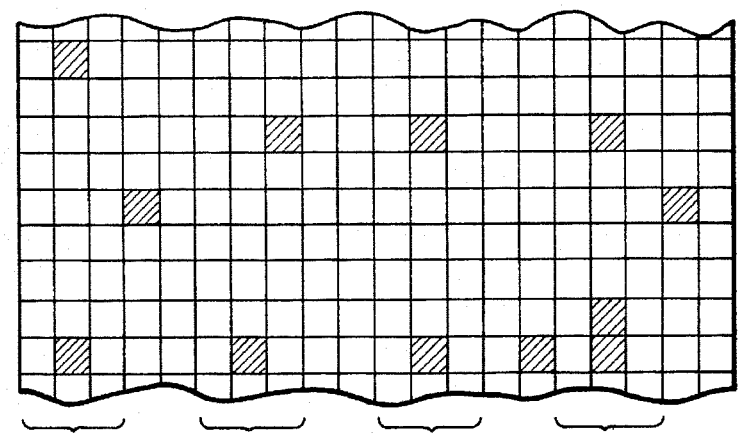
F I G. 53
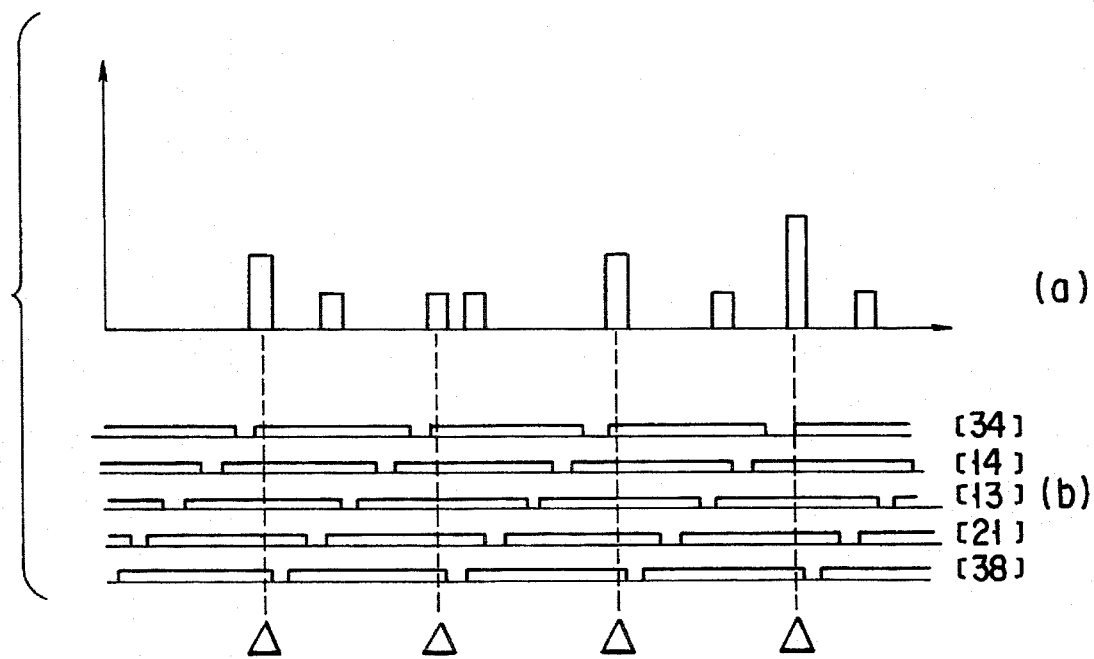
F I G. 54

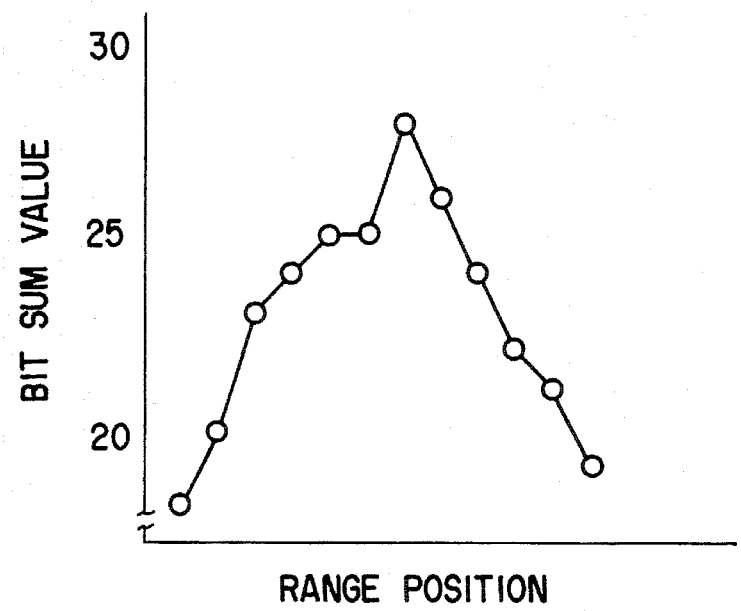
F I G. 57
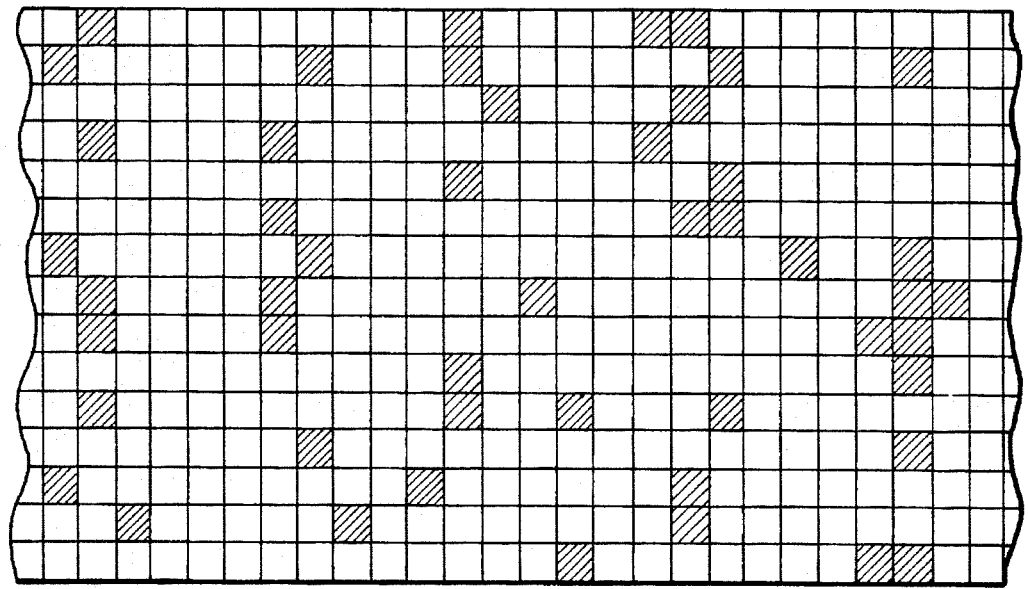
F I G. 58

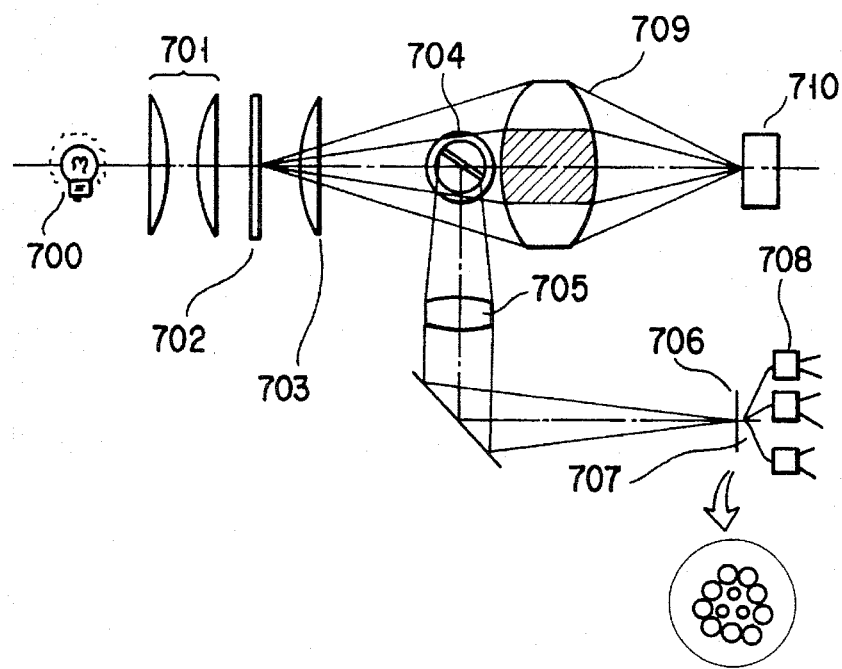
F I G. 63
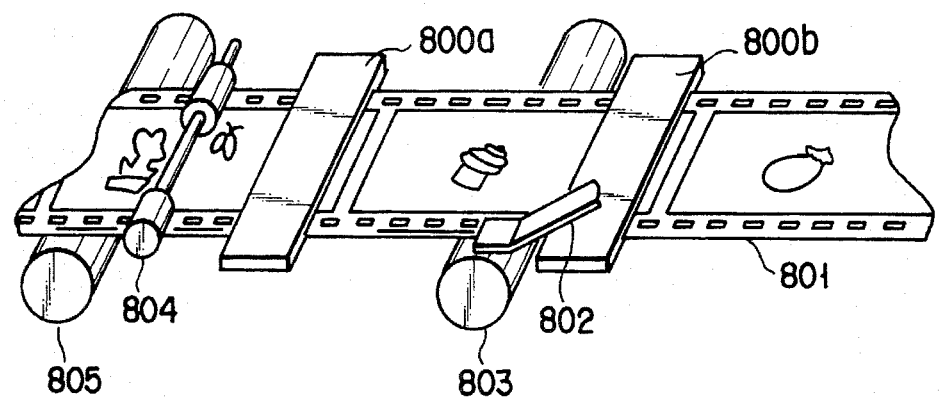
F I G. 64
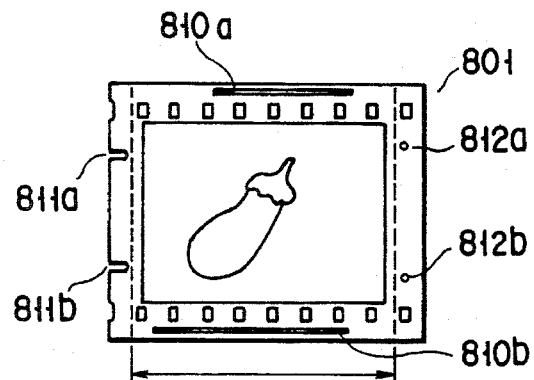
F I G. 65

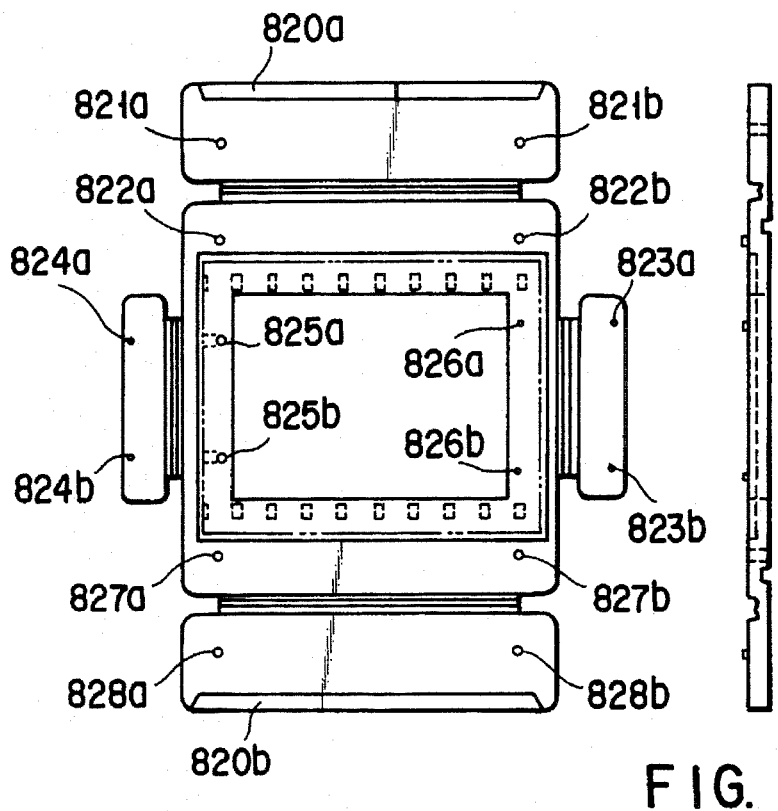
FIG. 66A
FIG. 66B
FIG. 66C
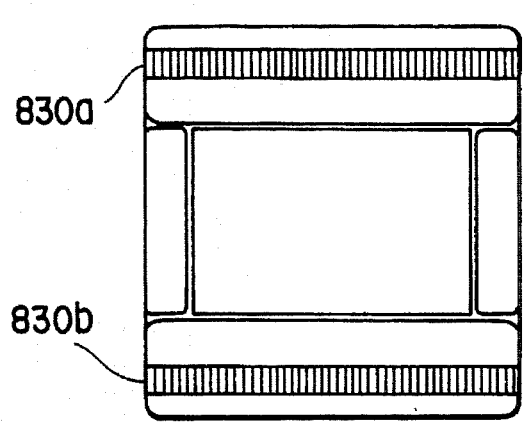
FIG. 67A
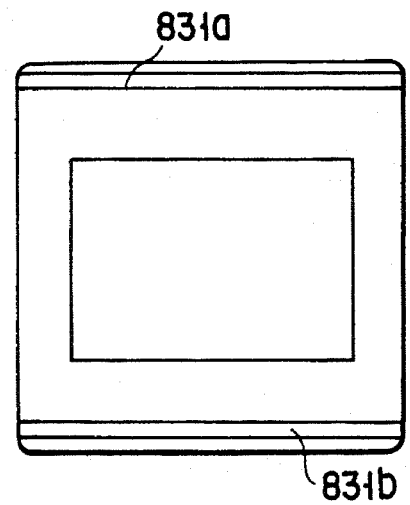
FIG. 67B

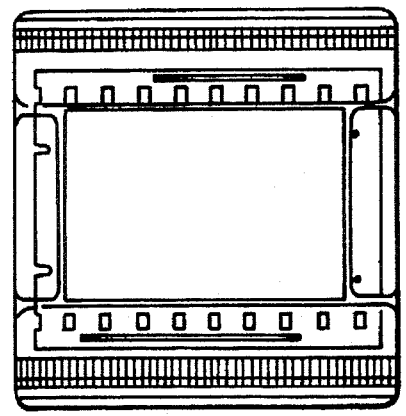
F I G. 68
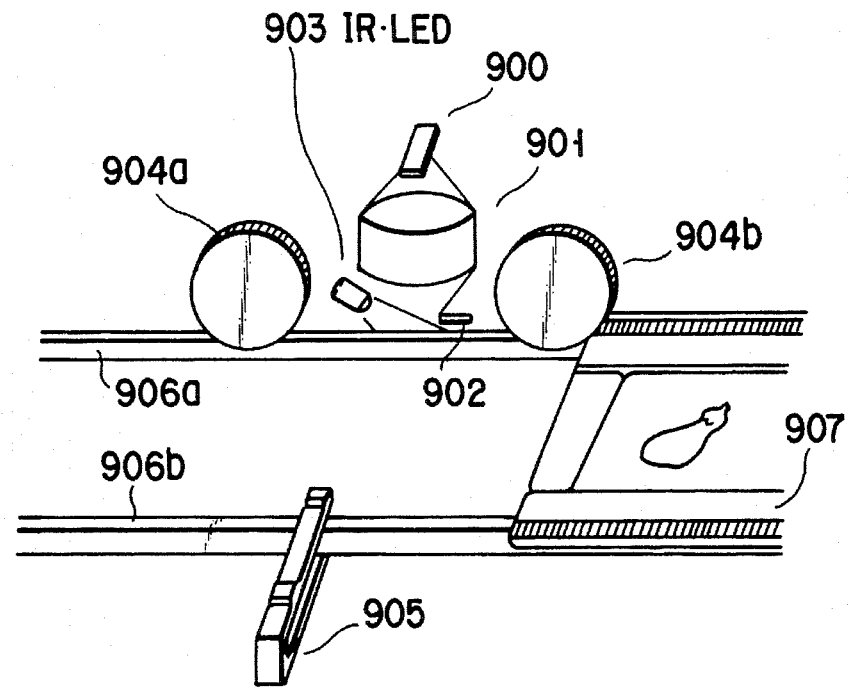
F I G. 69

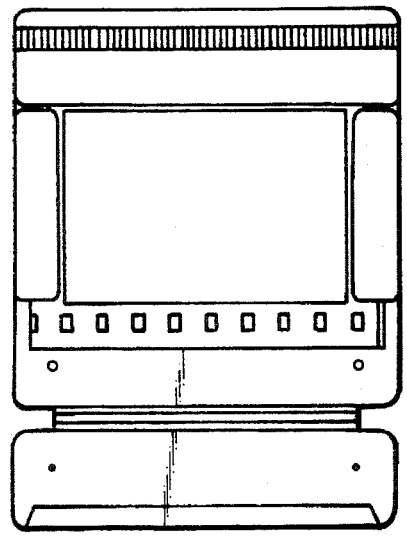
F I G. 70
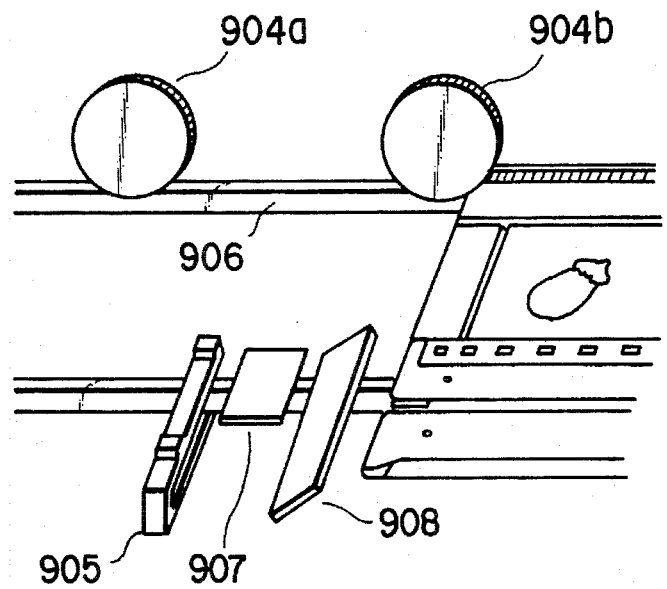
F I G. 71 dinner
FILM DATA RECORDING/REPRODUCING APPARATUS FOR A CAMERA BY WRITING/READING PITS RECORDED ON A FILM This application is a continuation, of application Ser. No. 08/025,642, filed Mar. 2, 1993, now abandoned.

BACKGROUND OF THE INVENTION

1. Field of the Invention

The present invention relates to a film data recording/reproducing apparatus and, more particularly, it relates to an apparatus comprising a data recording unit for storing data on a camera film and a data reproducing unit for retrieving data recorded on a camera film for the sake of convenience of handling a camera film after it has been used for shooting and developed.

2. Description of the Related Art

It is a known practice to use part of a camera film to record such data as the dates when and the situations where it is used for shooting.

While a newspaper camera man normally writes down on a piece of paper messages telling when and where the pictures were taken on the camera film he has just turned in so that the messages may always accompany the film after it is developed, it will be a great convenience for him if he can write down the messages directly on the camera film.

A clerk in a commercial library house storing a large volume of films may have to single out a particular film each time he or she receives an order for it from a client, e.g., an advertising agent or a publisher, consuming considerable time even if the films are classified into categories. It will save time and cost enormously if those films carry respective data on them that provide cues for film retrieval operations.

Technologies for storing data on part of a film are disclosed, for instance, in Publication Unexamined Japanese Patent Application No. 62-208028, Publication Unexamined Japanese Patent Application No. 2-148030, Publication Unexamined Japanese Patent Application No. 2-149835, Publication Unexamined Japanese Patent Application No. 51-95837, Publication Unexamined Japanese Utility Model Application No. 48-38841, Publication Unexamined Japanese Utility Model No. 62-116243, Publication Unexamined Japanese Utility Model No. 1-166332 and Publication Unexamined Japanese Utility Model No. 1-171438.

Some of the disclosed technologies are related to the use of bar codes on a 35 mm color film for indication of frame numbers and that of punched holes for a color film for indication of the type of film, while others relates to methods of imprinting the dates of film shooting and other data on a film.

According to these known technologies, the dates of film shooting and other data may be imprinted on the respective pictures of a film or, alternatively, such data may be recorded on the margin of a film along with other data so that a relatively large amount of information may be stored on a film.

While known technologies may easily meet the requirement of storing the dates of film shooting and other relatively simple data on a film, they can hardly be adapted to store a large amount of data on the margin of a film where frame numbers, the sensitivity of the film, the manufacturer's name and other pieces of information are already imprinted.

In short, known technologies are not compatible with the use of bar codes and mechanically punched holes and cannot accommodate a large volume of data. Thus, up until now, the old and conventional technique of writing letters on the film holder of a film or on the back of a printed picture provides a best way for storing data.

Since printed pictures do not carry any data, it is often a cumbersome and painstaking job to write down relevant messages on the back of each printed picture, turning front and back to confirm the relevancy of the messages to the picture.

Additionally, it is also painstaking to read the messages on the back of printed pictures because they are often scribbled in letters that can hardly be deciphered.

SUMMARY OF THE INVENTION

It is, therefore, an object of the present invention to provide a new and improved film data recording/reproducing apparatus capable of writing a large volume of data on a limited space of a camera film for the sake of convenience of handling the film after it has been used for shooting and developed without damaging the data optically recorded on the film at the time of manufacture.

According to an aspect of the present invention, there is provided a data recording apparatus for a camera using a photographing film comprising:

a thermal head arranged along a film path of a camera and capable of closely contacting with a photographing film in the camera, the thermal head having a plurality of fine heating sections to form fine pits on the photographing film; and control means for controlling heating conditions of the plurality of fine heating sections of the thermal head according to the data to be recorded on the photographing film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 15 is a graph schematically illustrating the operation of the clock line 144 and the data line 145 of the embodiment of FIG. 5 and their mutual relationship when a communication starts in the embodiment;

FIG. 16 is a graph showing in greater detail the part of the communication start request in the operation of FIG. 15;

FIG. 17 is a graph showing in greater detail the part of the communication start acknowledgement in the operation of FIG. 15;

FIG. 27 is a graph schematically illustrating the speed with which data are written in the embodiment of FIG. 5;

FIG. 28 is a graph schematically illustrating the relationship between the film take-up speed determined from the interval between two consecutive take-up pulses and the distance of movement of the film;

FIG. 29 is a schematic diagrammatic partial view of a 35 mm film, illustrating where encoded digital data is stored on the film differently from the film of FIG. 3;

FIG. 33 is a graph showing the relationship between the duty ratio of the applied voltage and the elapsed time;

FIG. 34 is an enlarged schematic sectional partial view of the thermal head of the embodiment of FIG. 5;

FIG. 37 is a schematic elevational view of a camera incorporating a second embodiment of data recording unit of the invention;

FIG. 38 is a schematic elevational view of a camera incorporating a third embodiment of data recording unit of the invention;

FIGS. 42A and 42B are schematic diagrammatic illustrations showing respectively the operation of the color spectral filters A518a and that of the color spectral filter B518b of FIG. 41;

FIG. 43 is a schematic diagrammatic illustration showing how the color additive type spectral filter is switched to the color subtractive type spectral filter in the unit of FIG. 40;

FIG. 44 is a schematic diagrammatic illustration similar to FIG. 43 but showing how the color subtractive type spectral filter is switched to the color additive time spectral filter in the unit of FIG. 40;

FIG. 45 is a schematic perspective view showing the configuration of a filter block and some of the related components that can be used for the unit of FIG. 40;

FIG. 46A is an extended schematic plan view of the filter block of the unit of FIG. 40;

FIG. 46B is a schematic plan view of color filters of complementary colors;

FIG. 46C is a schematic plan view of color additive type filters;

FIG. 53 is a schematic diagrammatic illustration similar to FIG. 52 but obtained by turning the latter clockwise by 90°;

FIG. 54 is a schematic diagrammatic illustration showing the relationship between the deviation square sum and the point for the distribution of FIG. 54;

FIG. 57 is a graph showing the relationship between the bit sum value and the range for every selected 15 longitudinal spots;

FIG. 58 is a schematic diagrammatic illustration showing vertical pit positions identified in a network having 15 rows of small meshes;

FIG. 63 is a schematic diagrammatic view similar to FIG. 61 but showing the configuration of a simplified embodiment obtained by eliminating the use of the return mirror 611 of the embodiment of FIG. 61 for the purpose of downsizing;

FIG. 64 is a schematic diagrammatic perspective view of an embodiment of a unit for recording encoded digital data on a developed film according to the invention;

FIG. 65 is a schematic diagrammatic partial plan view of a 35 mm reversal film carrying encoded digital data before it is loaded onto a film mount specifically designed for the above embodiment;

FIGS. 66A, 66B and 66C show respectively a front view, a side view and a partial sectional view of a film mount to be used for the embodiment of FIG. 64 for securely holding on it a film as illustrated in FIG. 65;

FIG. 67A is a schematic diagrammatic front view of the film mount of FIG. 66A when it is closed;

FIG. 67B is a schematic diagrammatic rear view of the film mount of FIG. 66A when it is closed;

FIG. 68 is a schematic diagrammatic front view of the film mount of FIG. 66A, where the film can be partly seen through the film mount because it becomes partly transparent in infrared radiation;

FIG. 69 is a unit to be used for retrieving encoded digital data stored on a film illustrated in FIG. 65 and fitted to a film mount as illustrated in FIG. 66A;

FIG. 70 is a front view of the film mount of FIG. 66A with its lower flap provided with a pair of pin holes 828a, 828b and is pulled down to open by means of a notch 820 so that digital data may be recorded on the film mounted thereon; and FIG. 71 is a unit to be used for recording encoded digital data on a film mounted on the film mount of FIG. 66A.

DETAILED DESCRIPTION OF THE PREFERRED EMBODIMENTS

Figure 1:
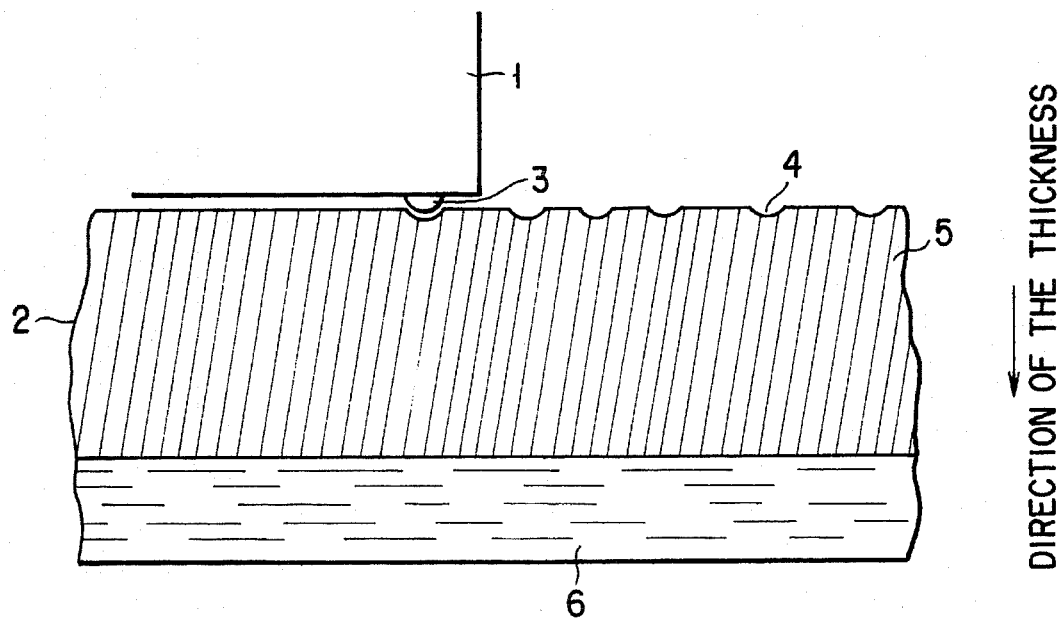
FIG. 1 is a schematic diagrammatic cross sectional partial view of a film where pits are being formed on a film base, illustrating the principle of the present invention.

Reference will now be made in detail to the presently preferred embodiments of the invention as illustrated in the accompanying drawings, in which like reference characters designate like or corresponding parts throughout the several drawings.

To begin with, some of the principal features of the present invention will be described by referring to FIGS. 1 and 2.

FIG. 1 is a schematic diagrammatic cross sectional partial view of a film showing that recesses or pits are being formed on the film base of a film as a recording section for storing a large volume of data concerning the film and the pictures taken on it.

Since, as illustrated in FIG. 1, pits 4 are shallow relative to a thickness direction, of a film 2, they do not adversely affect the strength of the film and can scatter rays of light only to a negligible extent. Thus, such pits are able to coexist with optical markings such as bar codes located on a film emulsion layer 6.

According to the invention, data concerning a film and the pictures taken on it are represented by and recorded in the form of pits 4, or shallow recesses, that are formed on film by locally heating the film base 5 of the film by means of a thermal head 1.

When the thermal head 1 comprising a plurality of fine heating sections 3 projecting from the thermal head is pressed against the film base 5, the surface of the film base 5 is locally deflected by the convex contours of the fine heating sections 3. While such deflections are removed to restore a flat surface of the film base 5 as soon as the fine heating sections 3 are set apart from the surface at room temperature, the film base 5 which is made of resin locally shows a phenomenon of glass transition and turns soft if the fine heating sections 3 of the thermal head 1 are heated to a high temperature. If the thermal head 1 is moved away from the film base 5 under this condition, the film base 5 is cooled without allowing the surface to restore its flatness, leaving recesses or pits on it as a result of permanent local deflections. Thus, it is possible to record a large volume of data on the film by forming a number of pits that are arranged in various different ways. Since pits 4 formed on a film can change the size and configuration under the influence of ambient temperature and other environmental factors, data are preferably encoded into digits that are represented by the distance between adjacent pits.

Figure 2:
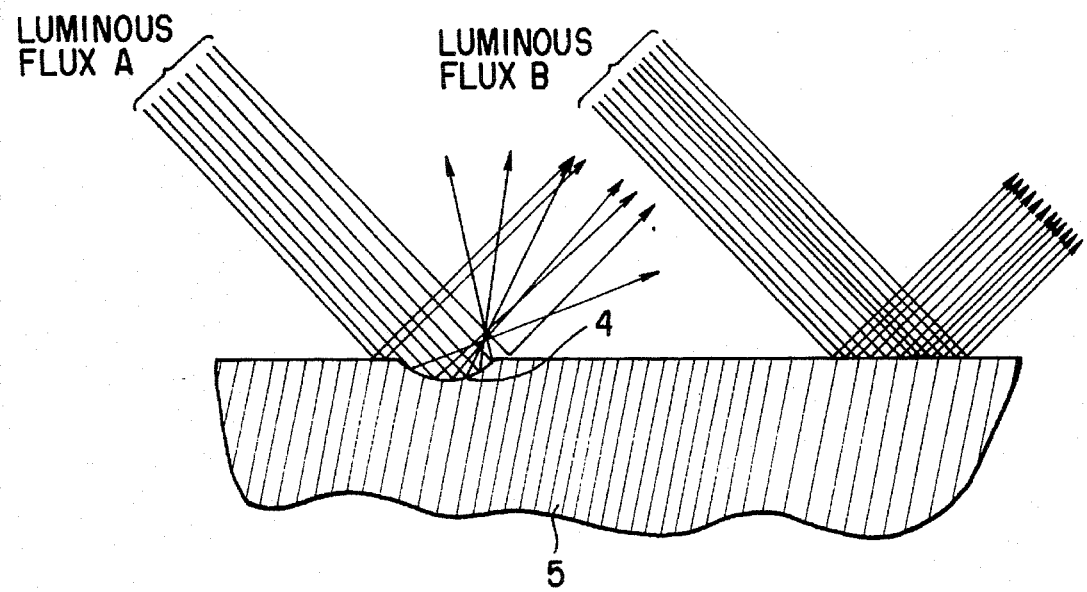
FIG. 2 is a schematic diagrammatic cross sectional partial view of a film, illustrating how pits are detected according to the invention.

FIG. 2 is a schematic diagrammatic cross sectional partial view of a film, illustrating how pits are detected for retrieval of data recorded on it according to the invention.

Referring to FIG. 2, when the surface of the film base 5 of a film that carries data in the form of pits 4 is irradiated with a luminous flux, the surface neatly reflects the luminous flux as indicated in the case of flux B as long as the latter hits a flat area of the surface but comes to show an irregular reflection and scatter rays of light once the flux hits a pit 4 as in the case of flux A.

Therefore, a detector disposed right above the surface of the film base 5 can detect part of the rays of light scattered by a pit 4. The luminous flux to be used for the purpose of the invention does not need to be that of visible light and may be that of near infrared light emitted from, for example, an infrared light emitting diode. A luminous flux of infrared light may be advantageous in that the rays of light reflected by a pit 4 do not interfere with those coming from the image recorded under the pit 4.

Now, the present invention having the above described principal features will be further described by referring to preferred embodiments of the invention.

Firstly, a first embodiment of data recording unit of the invention will be described by referring to FIGS. 3 through 36.

Figure 3:
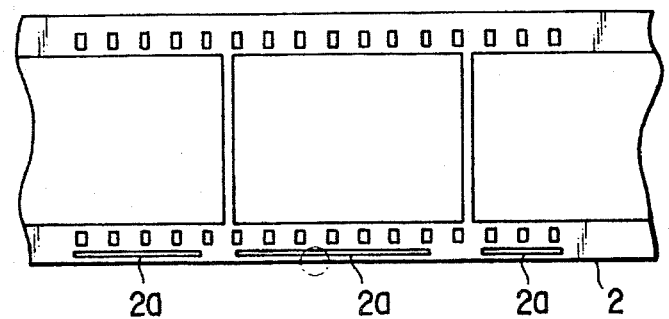
FIG. 3 is a schematic diagrammatic partial plan view of a 35 mm film, illustrating how digital data are recorded along the lateral edges of the film according to the invention.
Figure 4:
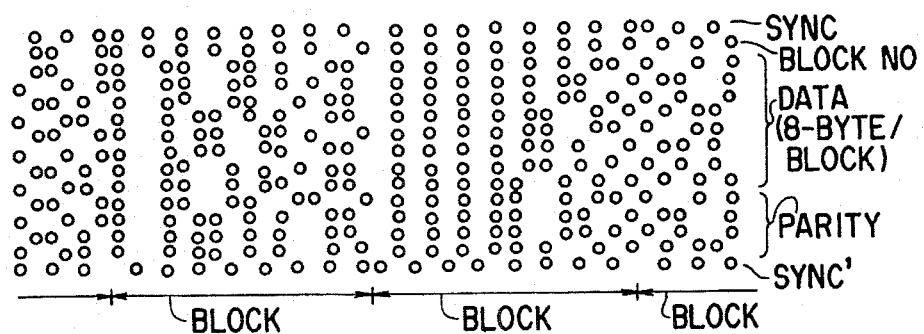
FIG. 4 is a schematic view of encoded digital data recorded on a film.

FIG. 3 is a schematic diagrammatic partial plan view of a 35 mm film, illustrating how digital data are recorded along the lateral edges of the film. FIG. 4 shows a schematic view of encoded digital data on the film. As seen from FIG. 4, data are stored on the film in the form of rows of horizontally arranged 8-bit data. A given number of rows of 8 bit data are collectively called a block here.

A block comprises a row for a SYNC signal which is a first synchronous signal for synchronization of recorded data, a row for an 8-bit data representing the identification number of the block, eight rows for eight 8-bit data, four rows for four parity signals to be used for parity error check of the eight 8-bit data and a row for a SYNC' signal which is a second synchronous signal that constitutes a pair with the first synchronous signal as arranged from the top down to the bottom.

Figure 5:
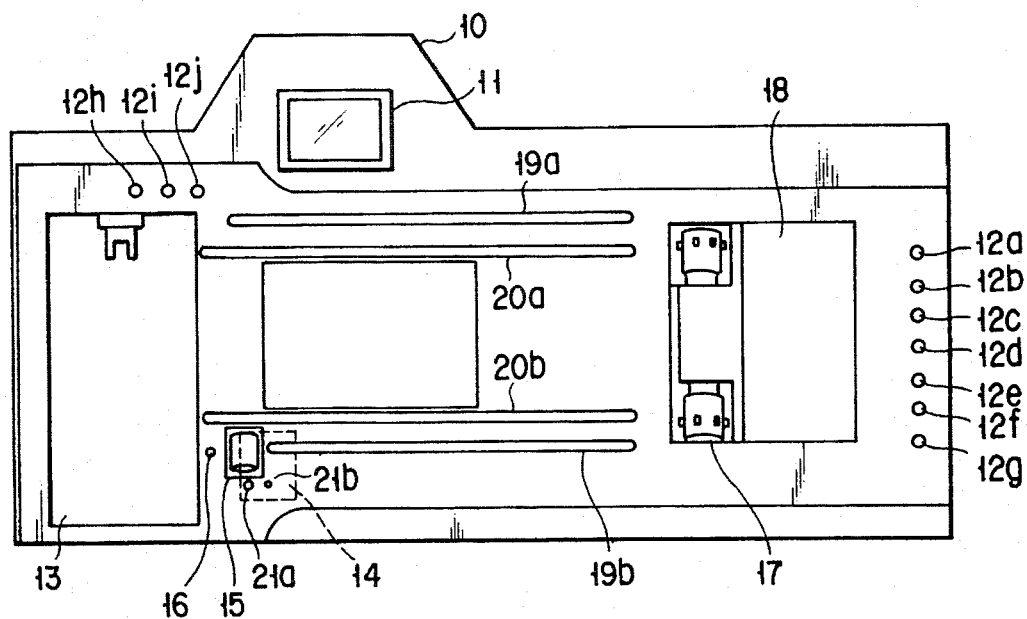
FIG. 5 is a schematic elevational view of a camera incorporating a first embodiment of a data recording unit of the invention.

FIG. 5 is a schematic elevational view of a camera incorporating the first embodiment of a data recording unit of the invention. Note that FIG. 1 shows a rear view of the camera body of a single-lens reflex camera with the camera back taken away from the camera.

In FIG. 5, reference numeral 11 denotes a viewfinder and reference symbols 12a through 12j denote respective electric contacts to be used for communication between the camera back (not shown) carrying a thermal head 1 (see FIG. 6) and the camera body 10.

Of the contacts 12a through 12j, the contacts 12a through 12g are respectively connected to signal contacts arranged on a camera back specifically designed and provided for data recording, a power source and the ground, while the contacts 12h through 12j are commonly used for connection with respective contacts arranged on said camera back or, alternatively with respective contacts arranged on a replacement camera back designed for imprinting a date on each picture taken on the film. Reference symbol 13 denotes a film cartridge chamber for receiving a film cartridge and reference symbol 14 indicates the position where the thermal head 1 for recording data is located when the camera back (not shown) is fitted in position to the camera.

Reference numerals 15 and 16 respectively denote a platen roller that cooperates with the thermal head 1 to pinch a film therebetween and a guide pin that correctly positions the film, whereas reference symbol 17 denotes a film feed roller for feeding the film to the film window at a predetermined rate.

Reference numeral 18 denotes a film take-up chamber for taking up the portion of the film that has been exposed and reference symbols 19a and 19b denote a pair of pressure rails, whereas reference symbols 20a and 20b denote a pair of film rails for correct alignment of the film when the latter is being fed.

Figure 6:
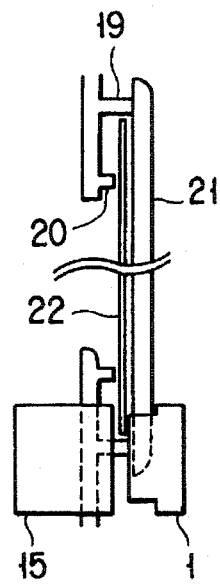
FIG. 6 is a schematic partial view of the embodiment of FIG. 5, showing the relationship among the platen roller 15, the film 22 and the thermal head 1.

FIG. 6 illustrates the positional relationship among the platen roller 15, the film 22 and the thermal head 1.

Referring to FIG. 6, as the camera back (not shown) is put on the camera to close the latter, the thermal head 1 comes down to the position as indicated by 14 in FIG. 5 to pinch the film 22 with the platen roller 15.

While four rows close to the bottom are used for parity signals in the data arrangement of FIG. 4, it should be noted that parity signals are not necessarily located there and errors may alternatively be corrected using a Reed Solomon's product sign method or a cross-interleave method such as a CIRC method popularly used in compact discs for parity check.

Figure 7:
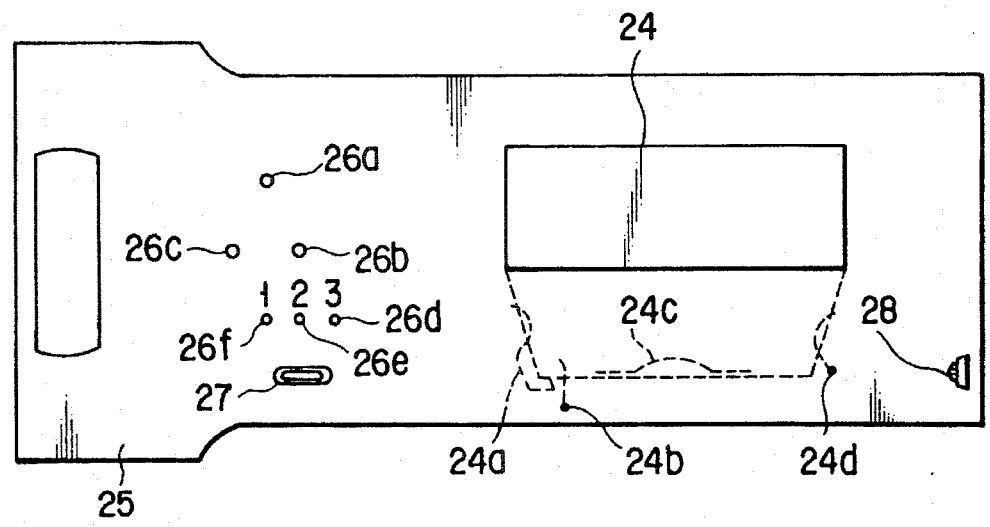
FIG. 7 is a schematic elevational view of the camera back of the camera of FIG. 5, showing the arrangement of the thermal head 1 and other components of the embodiment.

FIG. 7 is a schematic elevational external view of the camera back of the camera of FIG. 5 that carries the thermal head 1, showing how the thermal head 1 and other components are arranged.

The camera back 25 is made to swing around a hinge (not shown) disposed along its right edge to close the camera body 10 shown in FIG. 5.

On the outer surface of the camera back 25, there are provided a warning LED (light emitting diode) 26a, a power source LED 26c for indicating a battery dead status, a complete writing LED 26b for urging to complete a data writing operation and a mode select button 27 for selecting a mode of data writing operation from a set of a number of predetermined modes including one for initializing an operation of writing the type of data in a given position, one that can be defined by the user and one for writing external data from outside as well as mode indicator LEDs including LED 26f, LED 26e and LED 26d.

Figure 8:
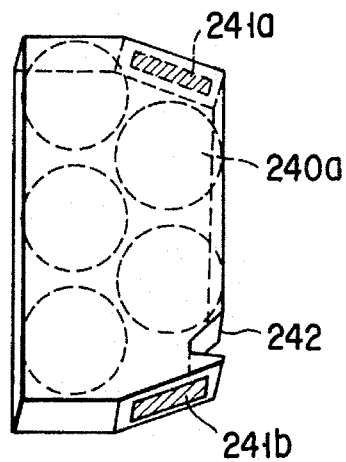
FIG. 8 is a schematic view of the battery magazine 24 of the embodiment of FIG. 5.

FIG. 8 is a schematic view of the battery magazine 24 of the embodiment of FIG. 5 for housing Ni-Cd rechargeable secondary batteries 240a connected in series.

When the battery magazine 24 is mounted on the camera back 25, the contacts 241a through 241d of the battery magazine 24 are electrically connected with the respective contact electrodes 24a through 24d disposed on the camera back 25. As the battery identifying notch 242 of the battery magazine 24 abuts the battery identifying contact 24b, the type of the batteries can be externally identified.

Figure 12:
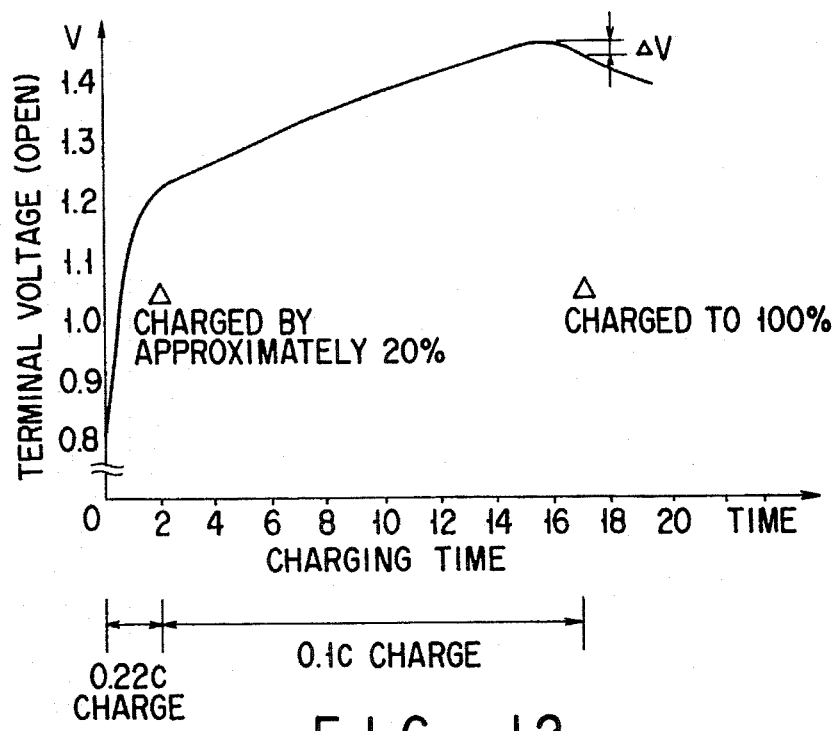
FIG. 12 is a graph showing the time required for recharging the batteries of the embodiment of FIG. 5.

FIG. 12 is a graph showing the time required for recharging the batteries of the embodiment of FIG. 5.

As seen from FIG. 12, the batteries are recharged up to 20% in an initial boost charge phase at 0.22C that lasts for approximately 2 hours, followed by a full charge phase carried out at 0.1C to complete the recharging. This two-phase recharge technique is advantageous in that the batteries can be recharged to a permissible minimum level to avoid degradation of the batteries in a limited period of time. The completion of a recharging operation can be detected by using the conventional method of sensing a fall in the terminal voltage by Δ as illustrated in FIG. 12.

Figure 9:
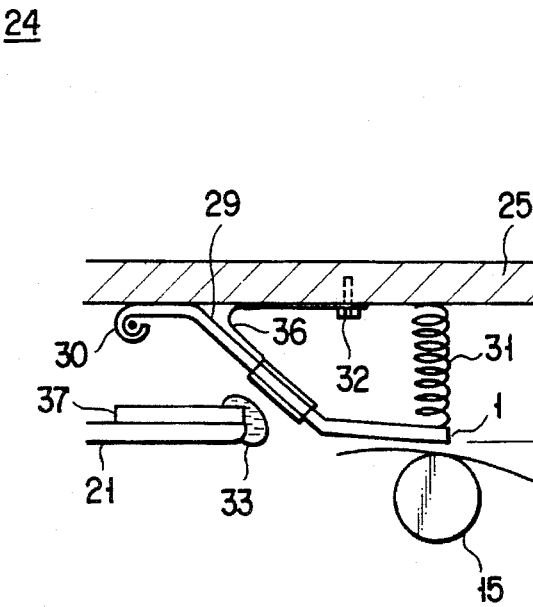
FIG. 9 is a schematic partial view of the embodiment of FIG. 5, illustrating how the thermal head 1 is loosely held to the camera back 25 of the camera by means of a pin 30 so that it may pivot on the pin 30 to a certain extent.

FIG. 9 is a schematic partial view of the embodiment of FIG. 5, illustrating how the thermal head 1 is loosely held to the camera back 25 of the camera by means of a pin 30 so that it may pivot on the pin 30 to a certain extent.

Figure 10:
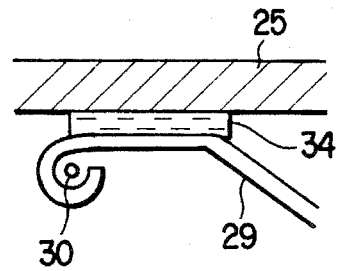
FIG. 10 is a schematic partial view of the embodiment of FIG. 5, illustrating in particular an adhesive rubber heat sink 34 disposed between a heat radiating plate 29 and the camera back 25.

FIG. 10 is a schematic partial view of the embodiment of FIG. 5, illustrating in particular an adhesive rubber heat sink 34 disposed between a heat radiating plate 29 and the camera back 25. The heat radiating plate 29 is so arranged that it may be movable to a certain extent and at the same time serve as a medium for rapidly transmitting heat from the thermal head 1 to the camera back 25. Thus, the thermal head 1 held by the heat radiating plate 29 can squeeze a film 22 with the platen roller 15 by the effect of a spring 31.

A dew sensor 37 is disposed on a pressure plate 21 of the camera in order to prevent thermal stress from being generated in the thermal head 1 by any dew drops that may be formed within the camera. A water absorbent member 33 is fitted to an end of the dew sensor 37 and projects from the corresponding end of the pressure plate 21. By arranging the batteries 24 near the heat radiating plate 29, the thermal head 1 can show a high heat transfer efficiency and the batteries 24 can become so much more active by the heat given to them.

Figure 11:
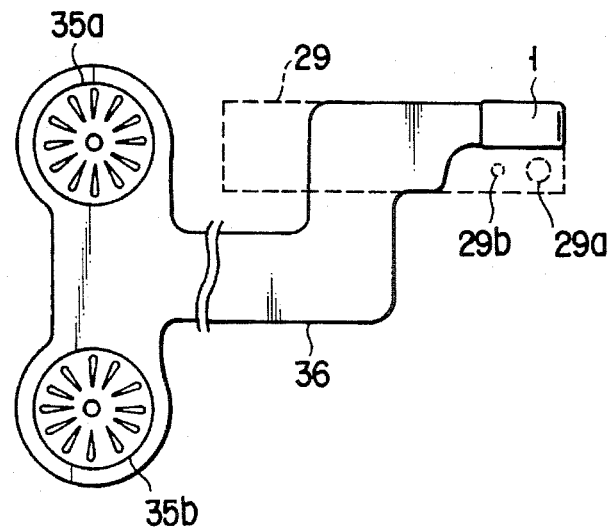
FIG. 11 is a schematic partial view of the embodiment of FIG. 5, illustrating in particular a flexible base plate 36 that serves as a conductor for electrically feeding the thermal head 1.

FIG. 11 is a schematic partial view of the embodiment of FIG. 5, illustrating in particular a flexible base plate 36 that serves as a conductor for electrically feeding the thermal head 1. A pair of sets of radially arranged contacts 35a and 35b are disposed at the respective opposite ends of the flexible base plate 36 and electrically connected to a print circuit board (not shown) disposed on the camera back 25 by means of a contact screw 32 (see FIG. 9) fitted to the heat radiating plate 29.

Thus, the module comprising the thermal head 1 and other component can be dismounted from the camera back 25 simply by removing the contact screw 32 and the pin 30 for replacement or servicing. So, the thermal head 1 can be replaced whenever it is worn or damaged or cleaned to remove the debris of the material of film base adhering to it whenever necessary.

When the camera back 25 is put on the camera body 10, a pair of thermal head guide pins 21a, 21b shown in FIG. 5 enters respective holes 29a and 29b bored in the heat radiating plate 29 as illustrated in FIG. 11 to place the thermal head 1 accurately in position.

Figure 13:
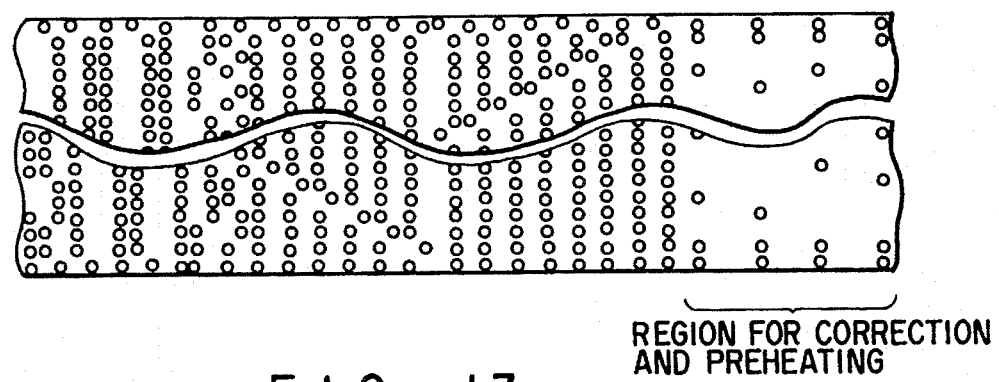
FIG. 13 is a schematic diagram of an example of the format in which data are written in the embodiment of FIG. 5.

FIG. 13 is a schematic diagram of an example of the format in which data are written in the embodiment of FIG. 5.

Prior to an operation of writing actual data in a writing region A in FIG. 13; a given number of pits are formed in a leading writing region B within a given area on the film to serve as correction data for preliminary positional adjustment required to detect and correct, if any, the divergence of the film, and hence the pits, from the correct track of the film as well as for preliminary heating required for the thermal head 1 to become fully operative.

Since the embodiment comprises a number of central processing units (CPUs) disposed on the camera back 25 for storing data, communication paths need to be established between the CPUs on the camera back 25 and the camera body 10 for transmission of timing signals and data signals.

The electric connection of a main CPU and sub CPUs and the format of communication among these CPUs are schematically illustrated in FIGS. 14 through 17.

Figure 14:
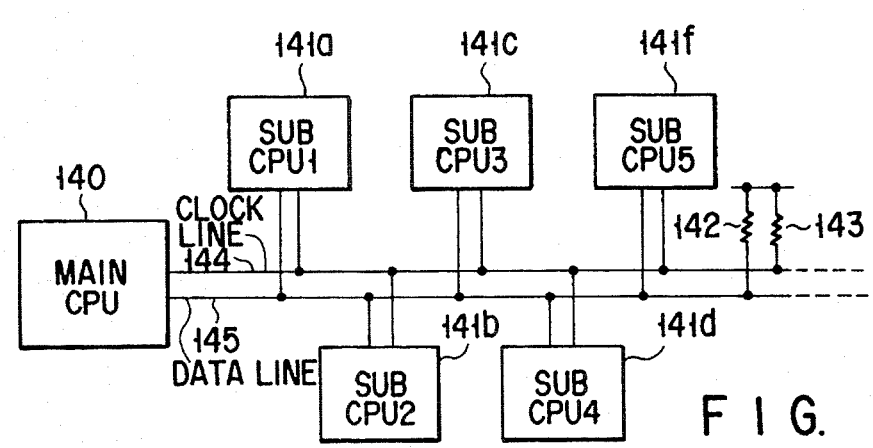
FIG. 14 is a schematic diagram showing how the main CPU and the sub CPUs of the embodiment of FIG. 5 are mutually wired, said CPUs being respectively arranged in the camera body 10, on the camera back 25 and other components of the camera.

FIG. 14 is a schematic diagram showing how the main CPU 140 and the sub CPUs 141a through 141f of the embodiment of FIG. 5 are mutually connected in parallel by means of a clock line 144 and a data line 145 to form a star connection, said clock line 144 and data line 145 being pulled up by respective pull-up resistors 143, 142.

FIG. 15 is a graph schematically illustrating the operation of the clock line 144 and the data line 145 of the embodiment of FIG. 5 and their mutual relationship when a communication starts in the embodiment. As long as no communication exists among the CPUs, the communication lines 144 and 145 of the CPUs are in a high impedance state and held to a high voltage by the pull-up resistors 142 and 143.

FIG. 16 is a graph showing in greater detail the part of the communication start request in the operation of FIG. 15 and FIG. 17 is a graph showing in greater detail the part of the communication start acknowledgement in the operation of FIG. 15. When a format of communication as illustrated in FIGS. 14 through 17 is used, the CPUs disposed respectively on the camera body 10 and the camera back 25 for storing data and the other CPUs can communicate with one another by way of a single pair of communication lines to minimize the space required to house them in the camera.

Figure 18:
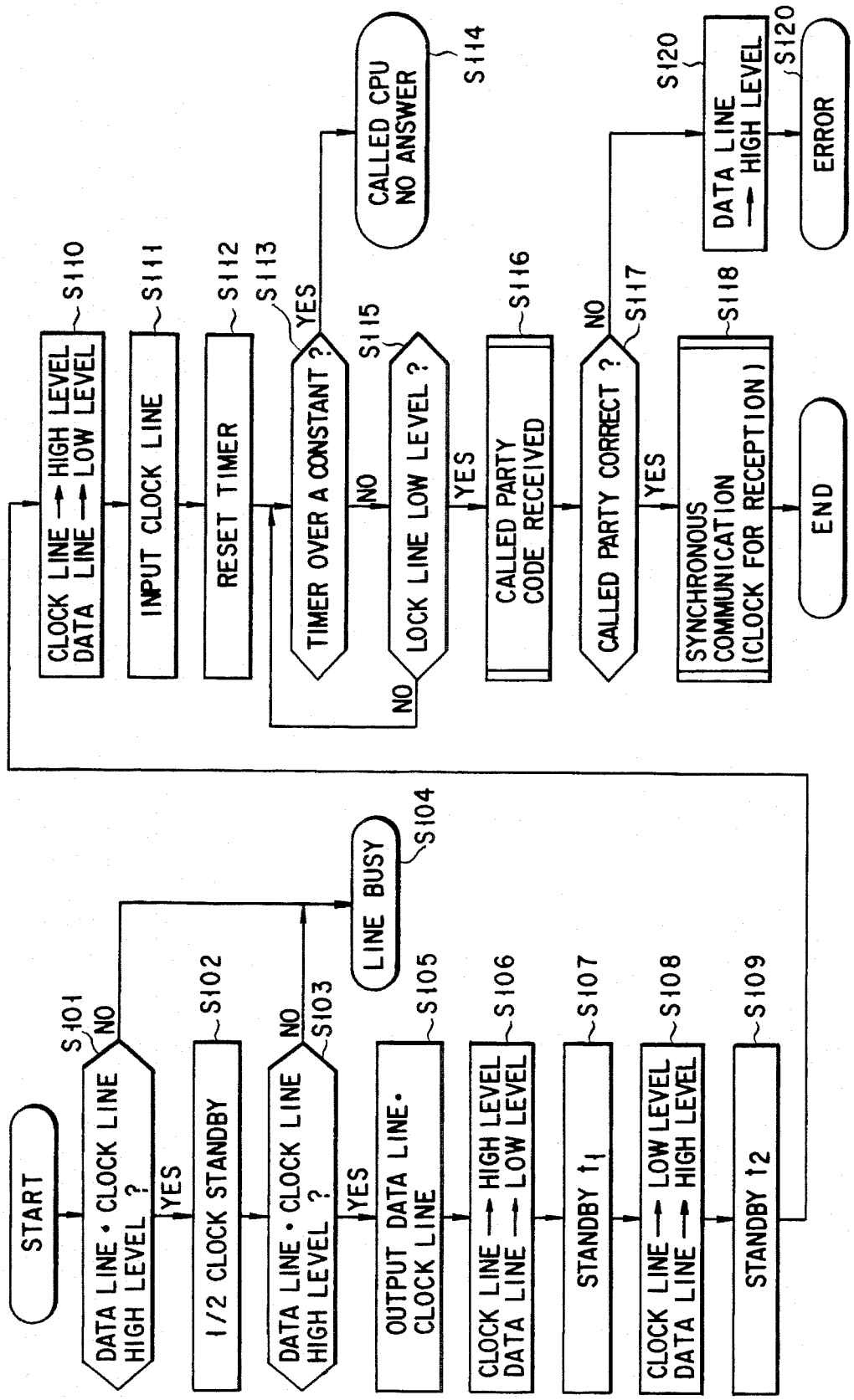
FIG. 18 is a flow chart of a subroutine to be used for communication in the embodiment of FIG. 5.
Figure 19:
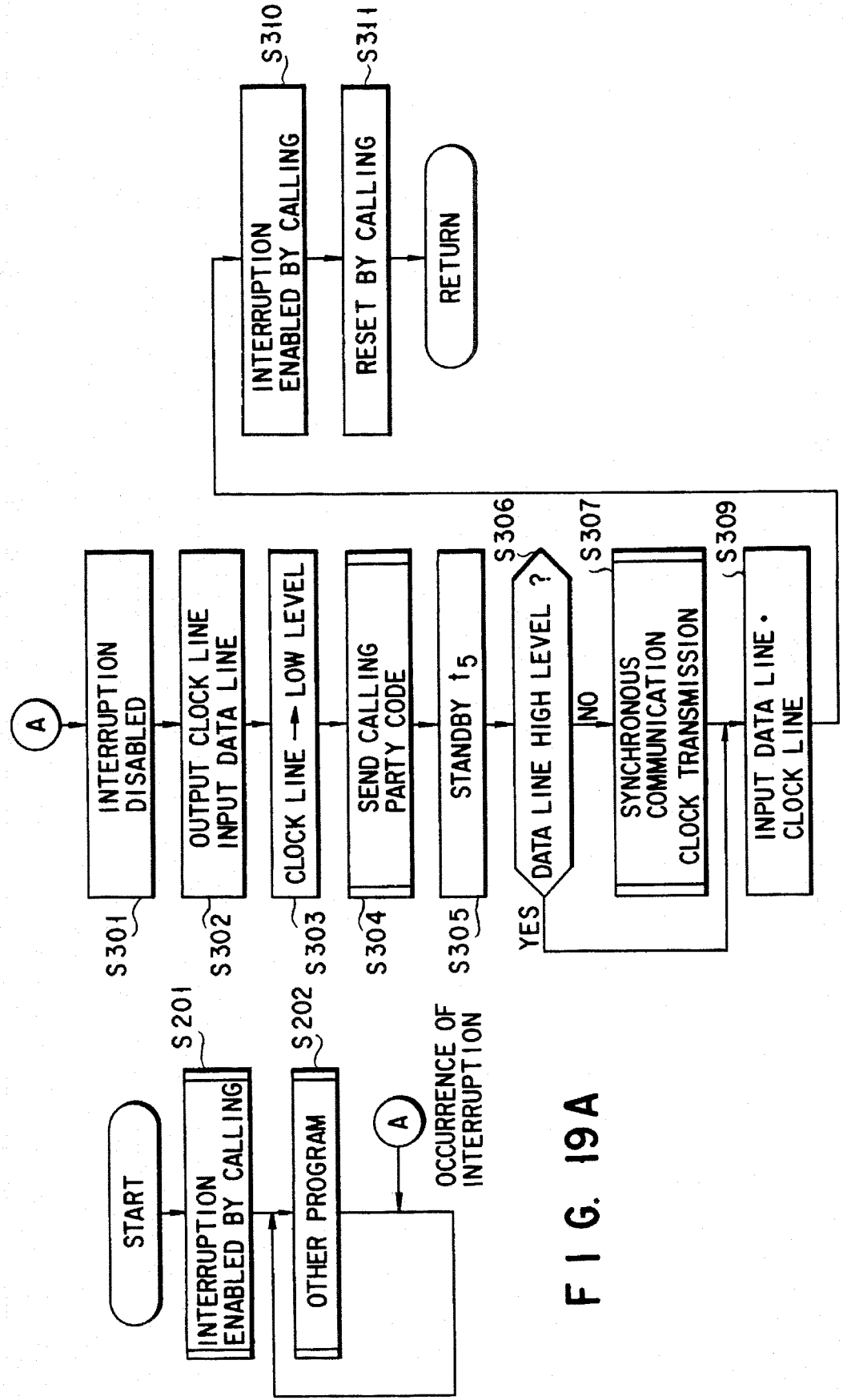
FIGS. 19A and 19B are flow charts of another subroutine to be used for communication in the embodiment of FIG. 5.

FIG. 18 is a flow chart of a subroutine to be used for communication in the embodiment of FIG. 5.

As soon as a communication is started, the CPU determines if the data and lock lines are set to "H", a high level, or not (step S101).

If it is determined in step S101 above that the level is not "H", the CPU judges that the communication lines are busy. If, on the other hand, if it is determined that the level is "H", the CPU waits for a ½ clock in step S102 and determines again if the data and clock lines are "H" or not (step S103).

If it is determined in step S103 above that the level is not "H", the CPU judges that the communication lines are busy. If, on the other hand, it is determined that the level is "H", the CPU allocates both the data and clock lines to data output (step S105) and turns the level of the clock line to "H", a high level, and that of the data line to "L", a low level (step S106).

Then, after waiting for time t1 as shown in FIG. 16 (step S107), the CPU turns the level of the clock line to "L" and that of the data line to "H" (step S108). After waiting for time t2 as shown in FIG. 16 (step S109), the CPU turns the level of the clock line again to "H" and that of the data line again to "L" (step S110). Thereafter, the CPU allocates the clock line to data input (step S111) and resets the internal timer (step S112). Then, the CPU determines if the timer has timed a given period of time or not (step S113).

If it is determined in step S113 above by the CPU that the internal timer has timed a given period of time, the CPU judges that the called CPU is not answering the call (step S114). If, on the other hand, it is determined in step S113 above that the timer has not timed a given period of time yet, the CPU checks if the clock line is "L" or not (step S115).

If it is determined in step S115 above that the clock line is not "L", the CPU again determines if the internal timer has timed a given period of time or not. If, on the other hand, it is determined that the clock line is "L", the CPU further determines if the called party code matches the called CPU (step S117).

If it is determined in step S117 that the called party code matches the called CPU, the calling CPU carries out a synchronous communication (step S118) and terminates the operation (step S119). If, on the other hand, it is determined that the called party code does not match the called CPU, the calling CPU turns the data line to "H" (step S120) and thereafter judges that an error has occurred and terminates the operation (step S121).

If an interrupt has occurred due to a communication start request from the calling CPU (T-CPU), (step S201 in FIG. 19A), the called CPU (R-CPU) disables any other interrupts (step S301 in FIG. 19B) and allocates clock line to data output and data line to data input (step S302 in FIG. 19B). Then, the R-CPU turns the clock line to "L" (step S303) and, after transmitting its own code (step S304), waits for time t5 (step S305). Thereafter, the R-CPU determines if the data line is "H" or not (step S306).

If it is determined in step S306 above that the data line is not "H", the R-CPU carries out a synchronous communication and, after transmitting a clock (step S307), allocates both the data line and clock line to data input (step S309). If, on the other hand, it is determined in step S306 above that the data line is "H", the R CPU immediately allocates both the data line and clock line to data input (step S309). Thus, the R-CPU enables interrupts by calling (step S310) and resets the lines by calling (step S311).

Figure 20:
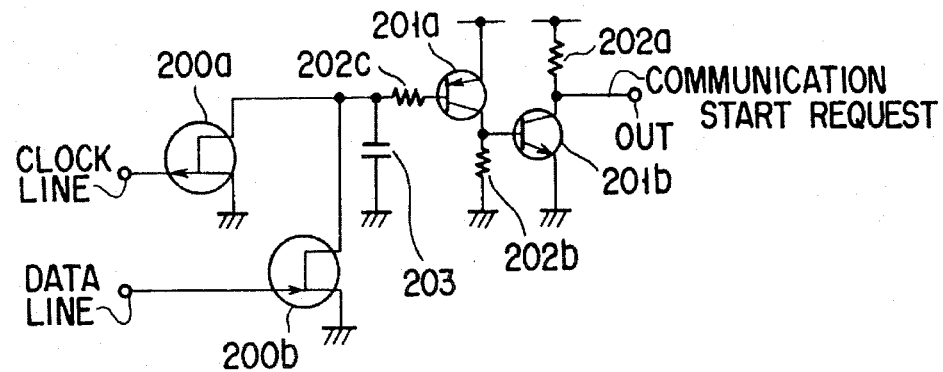
FIG. 20 is a schematic circuit diagram of a first circuit for detecting by hardware a communication start request signal in the embodiment of FIG. 5.
Figure 22:
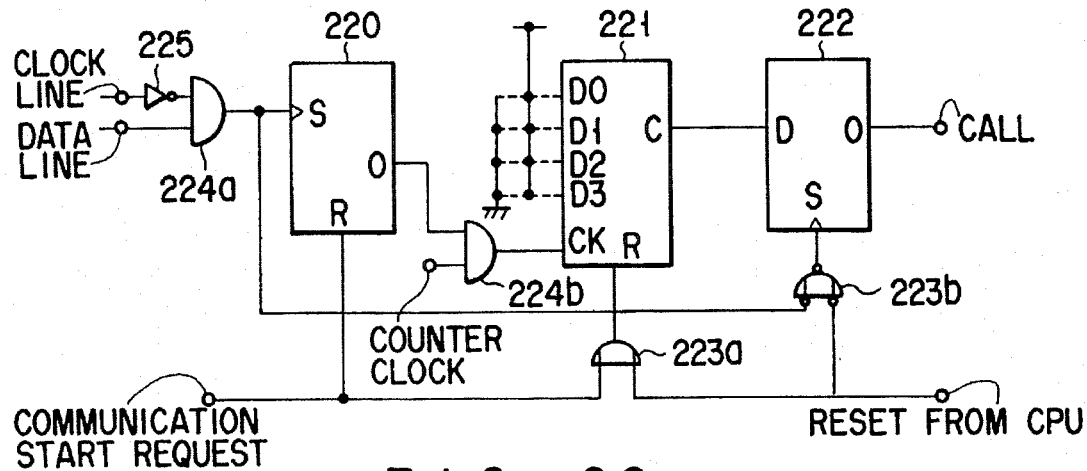
FIG. 22 is a schematic circuit diagram of a third circuit for detecting by hardware a calling signal for a start of communication.
Figure 23:
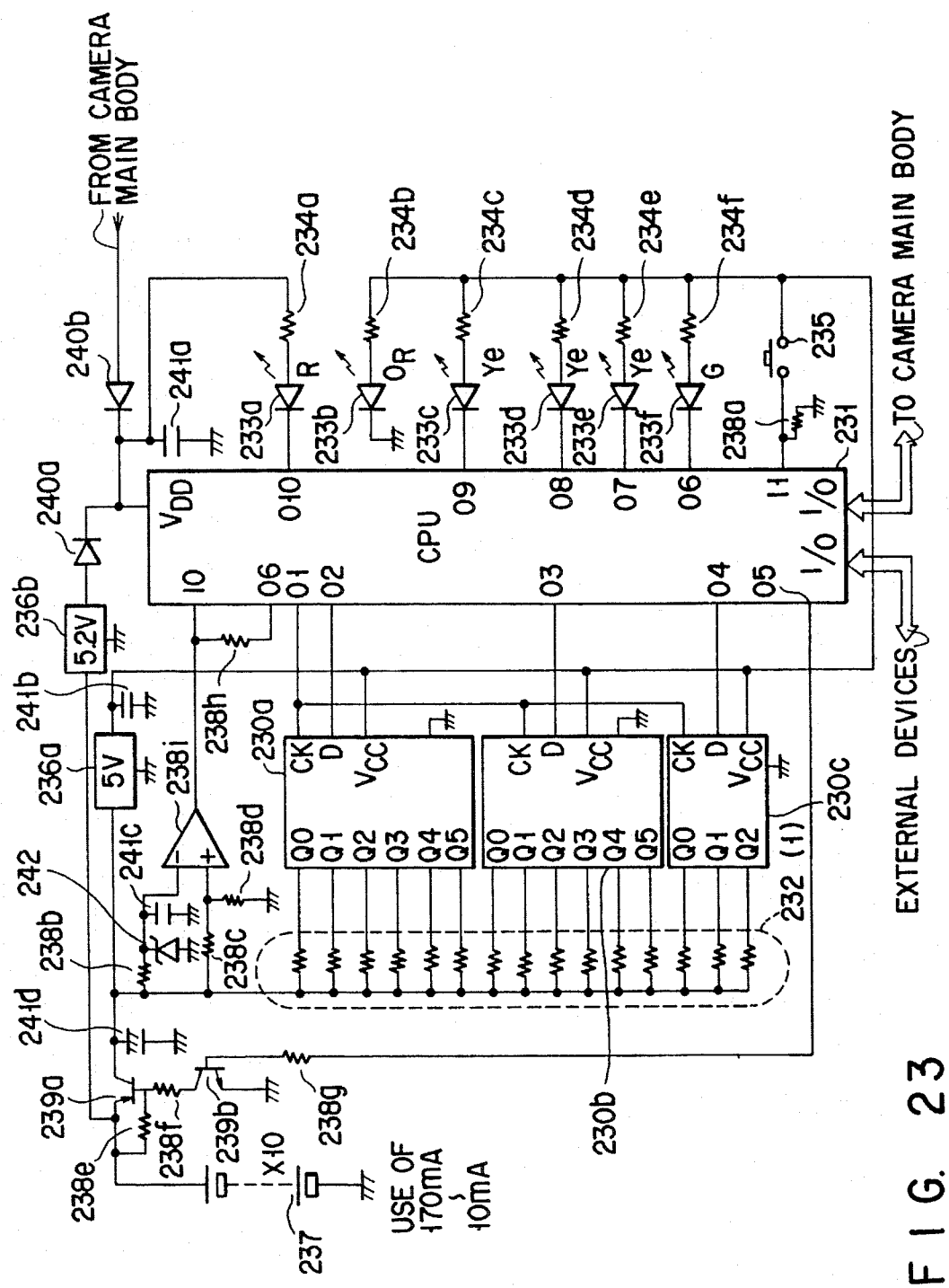
FIG. 23 is a schematic circuit diagram of the drive circuit of the embodiment of FIG. 5.

FIGS. 20, 22 and 23 schematically illustrate circuit configurations of three different circuits used for detecting by hardware a communication start request signal in the embodiment of FIG. 5.

In the circuit of FIG. 20, a first transistor device 200a is connected to another transistor 201a at one of its current paths by way of a resistor 202c while it is grounded at the other current path so that it is switching-controlled by signals coming in through the clock line.

On the other hand, a second transistor device 200b is also connected to the transistor 201a at one of its current paths by way of the resistor 202c while it is grounded at the other current path so that it is switching controlled by signals coming in through the data line.

The transistor 201a, on its part, is connected to a power source at one of its remaining current paths while it is grounded at the other current path by way of a resistor 202b and also connected to the base of a transistor 201b.

The transistor 201b, on its part, is grounded at one of its remaining current paths while it is connected to a power source at the other current path by way of a resistor 202a and also to the output terminal of the circuit to transmit communication start requests.

Figure 21:
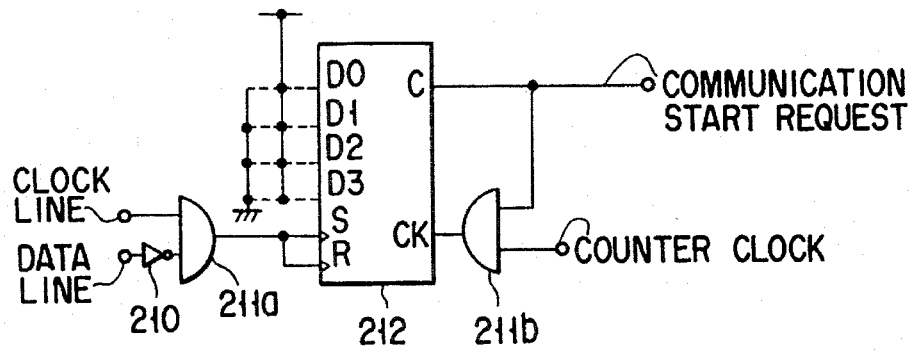
FIG. 21 is a schematic circuit diagram of a second circuit for detecting by hardware a communication start request signal in the embodiment of FIG. 5.

In the circuit of FIG. 21, an AND device 211a is connected to the clock line at one of its input terminals while it is connected to the data line at the other input terminal by way of a NOT device 210. The output terminal of this AND device 211a is connected to both the set terminal S and the reset terminal R of a counter 212.

The data terminals D0 through D3 of said counter 212 are connected to a power source and grounded respectively while its clock counter CK receives counter clocks by way of another AND device 211b. Communication start requests are transmitted through the C terminal of the counter 212.

Both circuits of FIGS. 20 and 21 function in a similar way and are connected to a third circuit having a configuration as illustrated in FIG. 22.

Referring now to FIG. 22, the communication start request transmitted from the circuit of FIG. 20 or that of FIG. 21 is applied to the reset terminal R of a flip-flop 220 and one of the input terminals of an OR device 223a.

As a reset signal is transmitted from the CPU, it is entered into said OR device 223a by way of the other input terminal and, at the same time, into a negative logic OR device 223b by way of one of its input terminals.

An AND device 224a which is connected at one of its input terminals to the clock line by way of a NOT device and at the other input terminal to the data line is also connected at the output terminal with the set terminal S of the flipflop 220.

The output terminal of said AND device 224a is also connected to the other input terminal of said negative logic OR device 223b and the output terminal of said negative logic OR device 223b is connected to the set terminal S of a latch 222.

The output terminal O of said flipflop 220 is connected to one of the input terminals of an AND device 224b and the other input terminal of said AND device 224b is connected to a counter clock while its output terminal is connected to the clock terminal CK of a counter 221. The output terminal C of said counter 221 is connected to the data terminal D of the latch 222, which transmits call signals through its output terminal O.

It should be noted that all or part of these circuits may be replaced by software stored in the CPU.

FIG. 23 is a schematic circuit diagram of the drive circuit of the recording system of FIG. 5.

Referring to FIG. 23, a power source battery 237 is connected to switching transistors 239a and 239b which are controlled for ON/OFF by signals from the terminal O5 of a CPU 231. The switching transistors 239a and 239b are connected to a noise reduction capacitor 241d and, at the same time, to a 5V 3-terminal regulator 236a and the common electrode of resistors 232 that constitute the thermal head 1. A 5.2V 3-terminal regulator 236b is directly connected to the power source.

Said regulator 236b and the power source of the camera body are connected to the terminal $V_{DD}$ of the CPU 231 by way of respective diodes 240a and 240b.

A comparator 238i compares the constant voltage from a voltage regulator diode 242 with the supply voltage and transmits its output to the $I_0$ terminal of the CPU 231. The terminal $I_0$ of the CPU 231 is connected to the terminal $O_6$ of the same CPU 231 by way of a resistor 238h to prevent any latch-up phenomenon from occurring.

The terminals $O_2$, $O_3$ and $O_4$ of said CPU 231 are connected to the respective terminals D of drivers 230a, 230b and 230c and the terminals Q of these drivers 230a, 230b and 230c are connected to the respective resistors 232 that constitute the thermal head 1.

The terminals $O_6$ through $O_{10}$ of said CPU 231 are connected to respective LEDs 233a and 233c through 233f that indicate "warning", "mode 3", "mode 2", "mode 1" and "complete writing" respectively. LED 233b indicates the status of the "power source" and is turned on when said switching transistor 239a becomes ON.

The $I_1$ terminal of the CPU 231 which is grounded by way of a resistor 238a is also connected to a switch 235 for mode selection. The LEDs 233b through 233f and the switch 235 are connected to said 5V of 3-terminal regulator 236a either directly or by way of respective resistors 234b through 234f. The LED 233a is connected to the $V_{DD}$ terminal of the CPU 231 by way of a resistor 234a.

The two I/O terminals of said CPU 231 are respectively connected to the camera body and an external apparatus. The CPU 231 operates to encode data transmitted from the camera body concerning the images taken by the camera and the exposure related conditions of the camera and record the encoded digital data on the film by way of the drivers 230a through 230c and the thermal head 1.

The circuit as described above operates in a manner as described below by referring to FIGS. 24 and 25.

Figure 24:
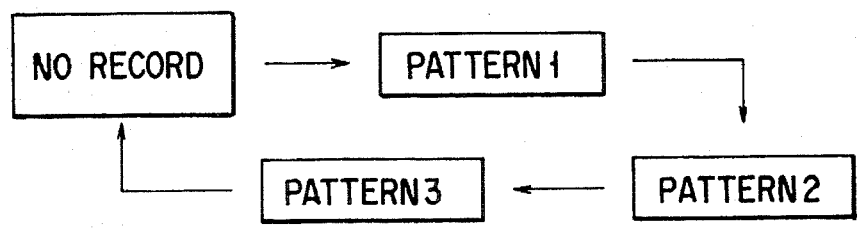
FIG. 24 is a schematic diagram illustrating the write mode operation of the embodiment of FIG. 5.

FIG. 24 is a schematic diagram illustrating the write mode operation of the embodiment of FIG. 5. In this mode of operation, "no record", "mode 1", "mode 2", "mode 3" and "no record" cyclically come into effect when the mode select switch 235 is operated repeatedly.

Figure 25:
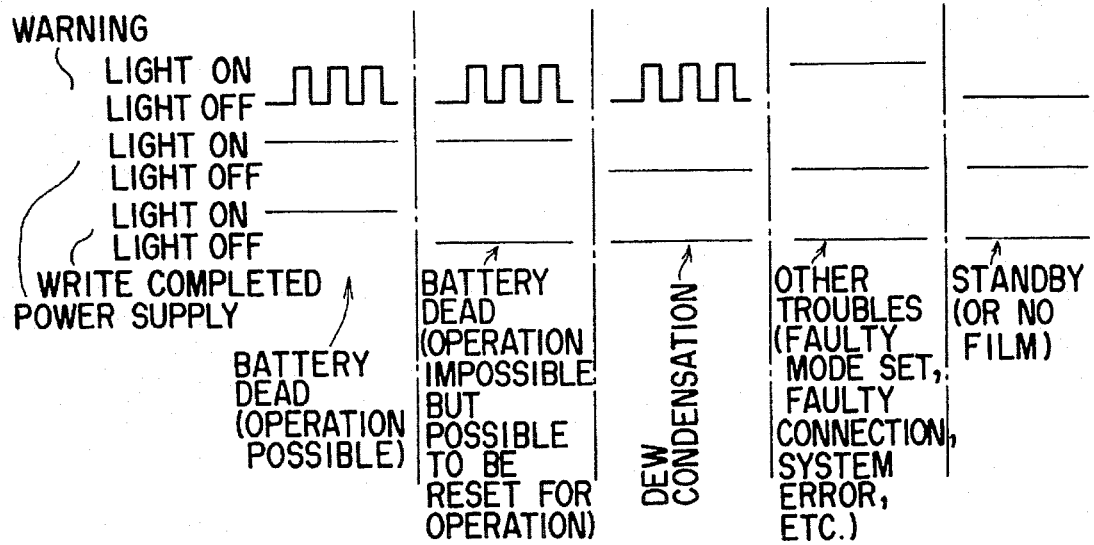
FIG. 25 is a graph schematically illustrating on/off operations of the light emitting diodes of the embodiment of FIG. 5 for warning and displaying the status of the power supply and urging to complete a data writing operation.

FIG. 25 is a graph schematically illustrating on/off operations of the light LEDs for warning and displaying the status of the power supply and urging completion of a data writing operation. The power source battery can keep on a writing operation but is nearly dead when the warning LED is "flashing", the power supply LED is "on" and the complete writing LED is "on".

The power source battery is completely dead when the warning LED is "flashing", the power supply LED is "off" and the complete writing LED is "off".

A trouble has occurred when the warning LED is "on", the power supply LED is "off" and the complete writing LED is "off". A trouble may be that a mode is not correctly selected, that connection is defective somewhere in the unit or that a system error has occurred.

Finally, when the warning LED is "flashing", the power supply LED is "on" and the complete writing LED is "on", it indicates a standby condition, which may be no film available in the camera.

Figure 26:
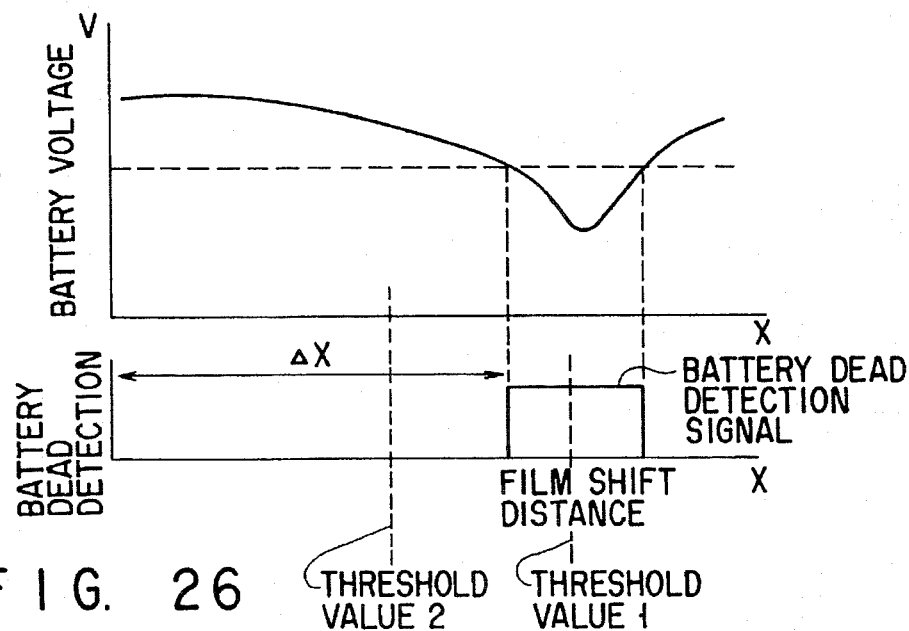
FIG. 26 is a graph schematically illustrating how a battery down status is detected in the embodiment of FIG. 5.

FIG. 26 is a graph schematically illustrating how a battery down status is detected in the embodiment of FIG. 5.

As seen from FIG. 26, as the power source voltage goes down, a battery dead condition is detected by the voltage regulator circuit and the comparator 238i.

In this embodiment, if the distance of movement of the film Δx is greater than threshold value 2 and smaller than threshold value 1 when the battery dead signal is set to a high level, it is determined that the battery can keep on a writing operation next time. On the other hand, if the distance is smaller than threshold value 2, it is determined that a next writing operation cannot be successfully completed.

FIG. 27 is a graph schematically illustrating how film take-up pulses are generated as the film is taken up in the embodiment of FIG. 5.

As shown in FIG. 27, when the film is taken up by one frame, the interval between two successive pulses generated by the film take-up motion is relatively large in the initial stages because the film is taken up at a relatively large speed but the interval is gradually reduced until it reaches a constant level.

FIG. 28 is a graph schematically illustrating the relationship between the film take-up speed determined from the interval between two consecutive take-up pulses and the distance of movement of the film.

As illustrated, a data writing operation is initiated at the second pulse from which the film take-up speed comes close to a constant level.

If the pulse width of the preceding pulse is less than threshold 1 in terms of the film take-up speed, the data writing operation will be conducted at a low rate, whereas it will be conducted at a medium rate when the film take-up speed is found below threshold 2 and at a high rate when the film speed is found above threshold 2.

While the data writing operation is carried out with a group of predetermined different rates in the above embodiment, it may alternatively be controlled by using each pulse width so that it matches the pulse width of the previous pulse.

FIG. 29 is a schematic diagrammatic partial view of a 35 mm film, illustrating encoded digital data stored on the film differently from the film of FIG. 3.

A 35 mm film is provided with two rows of perforations that are used to forward the film as illustrated in FIG. 29. In this example, data are stored in areas between two successive perforations.

Figure 30:
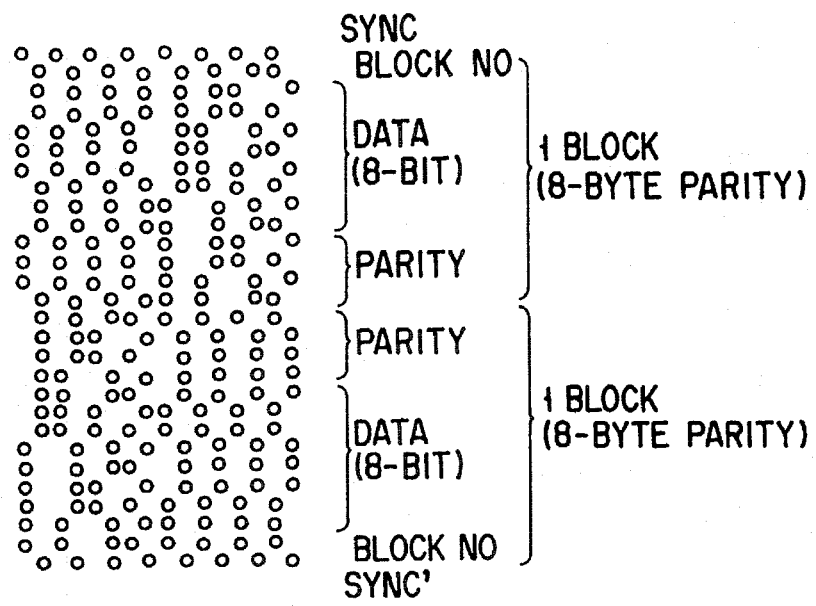
FIG. 30 is a schematic illustration of the format in which encoded digital data are stored on a film and which is different from that of FIG. 4.

FIG. 30 is a schematic illustration of the format in which encoded digital data are stored on a film and which is different from that of FIG. 4.

As seen from FIG. 30, this format is obtained by using two of the format of FIG. 4 and symmetrically arranging them except the SYNC and SYNC' signals.

Figure 31:
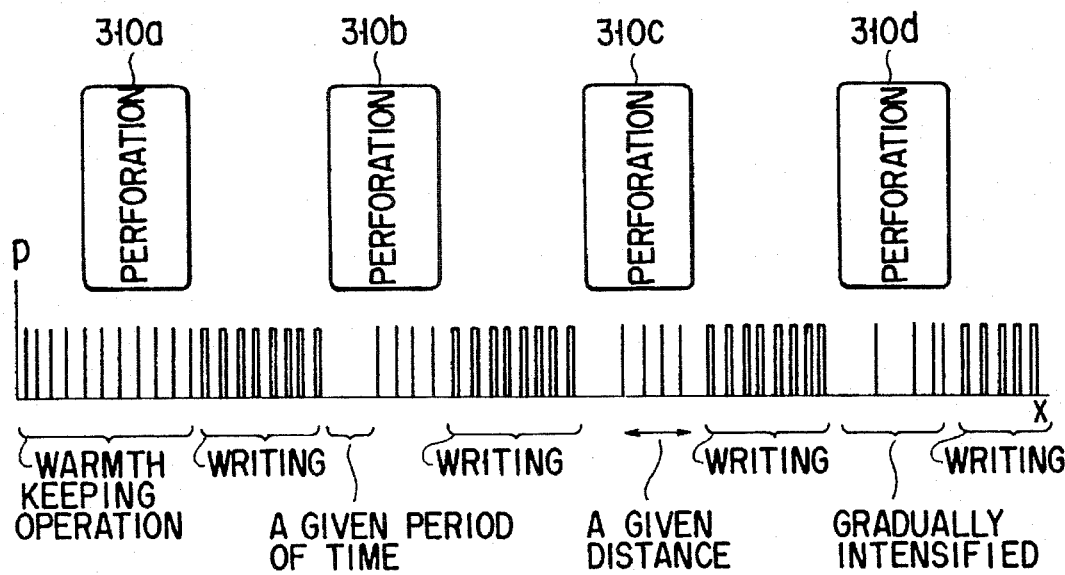
FIG. 31 is a graph showing the relationship between the timing of operation of driving the thermal head and the position of the film of the embodiment of FIG. 5.

FIG. 31 is a graph showing the relationship between the timing of operation of driving the thermal head and the position of the film of the embodiment of FIG. 5.

In FIG. 31, perforations are shown in the upper half while the lower half is used to show how electric power is supplied to the thermal head for each data writing position. A data writing operation starts at the left end and proceeds toward the right end of each writing position. Power is supplied to the thermal head for warm-up intermittently at a high frequency to make each power-up duration very short until the thermal head passes by a first perforation. After passing by the perforation, a data writing operation actually starts.

As the thermal head passes by a second perforation or when the thermal head is separated from the edge of the first perforation by a given distance, the thermal head returns to the warm-up phase of operation. Alternatively, the power-on period in the warm-up phase may be made longer in the initial stages and become gradually shorter with time.

Figure 32:
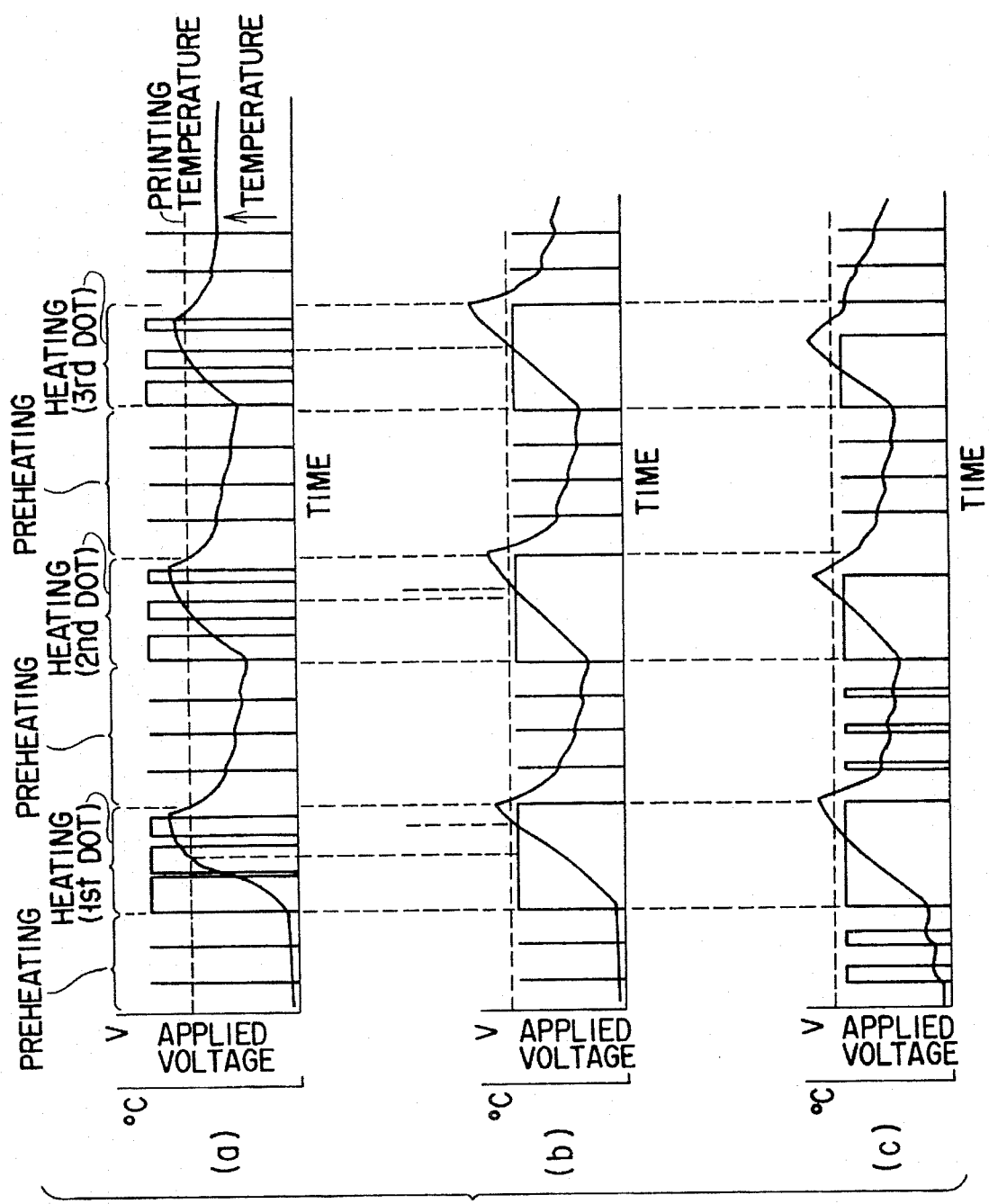
FIG. 32 is a set of graphs illustrating different modes of operation of driving the thermal head for writing data in pits.

FIG. 32 is a set of graphs illustrating different modes of operation of driving the thermal head for writing data in pits. In these graphs, the bars represent the supplied power and the curved lines represent the temperature of the heating elements of the thermal head. Once the temperature of the heating elements exceed the specified data recording temperature, the film base can show a phenomenon of glass transition so that data can be recorded on it.

In the mode of operation of graph (a) of FIG. 32, a given voltage is applied to produce three drive pulses in order to write data in a pit in such a manner that the first pulse shows the largest pulse width and the last one has the smallest width.

In the mode of operation of graph (b) of FIG. 32, a given voltage is applied to produce a single but wide pulse without trying to control the data writing operation as a function of duty ratio.

As shown in graph (a) of FIG. 32, every heated pit exceeds the given data recording temperature to the same extent so the pit size will be substantially identical for all heated pits. In the case of graph (b) of FIG. 32, on the contrary, those pits that are heated in the initial stages of a data recording operation have a relatively small size and, thereafter, the pit size will increase as a function of the time elapsed since the beginning of the operation.

Finally, in the case of graph (c) of FIG. 32, the voltage in the preliminary heating stage is also controlled as a function of duty ratio and the voltage applied to record data does not to produce more than one pulse for a single pit although it is also controlled as a function of duty ratio. Obviously, the data recording operation will be more accurately controlled with such an arrangement. Note that a same pit size can be secured for all heated pits without splitting the applied voltage to form pulses for simplification of the overall operation and reduction of cost.

FIG. 33 is a graph showing the relationship between the duty ratio of the applied voltage and the elapsed time. As clearly seen from the graph, the duty ratio varies within the same single pit and particularly so between the first and second dots.

Figure 35:
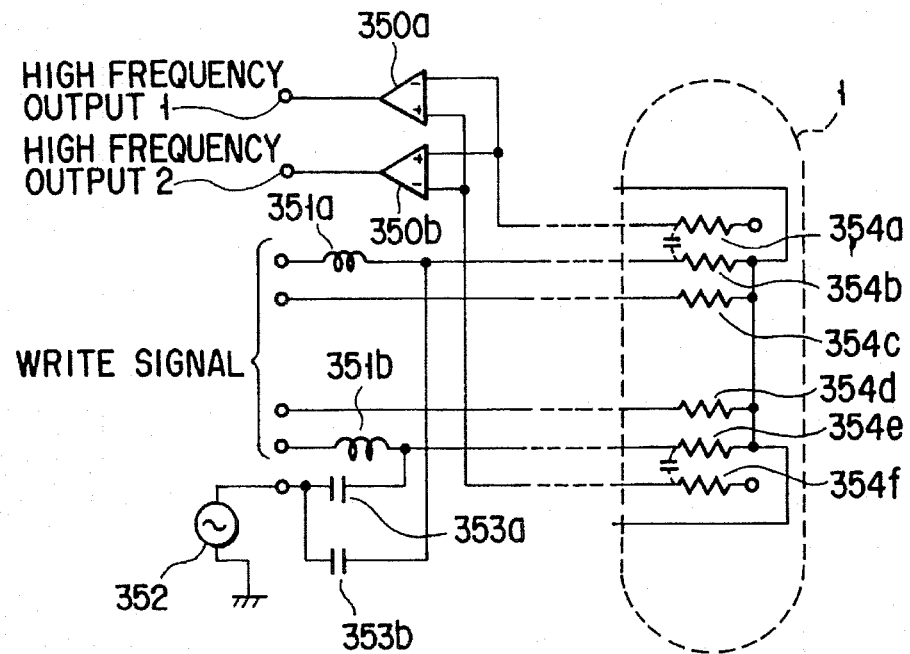
FIG. 35 is a schematic diagrammatic illustration of the operation of detecting a perforation of the film in order to write data on an area of the film as indicated in FIG. 29.

FIGS. 34 and 35 illustrate how a perforation is detected to write data in a position as illustrated in FIG. 29.

FIG. 34 is an enlarged schematic sectional partial view of the thermal head. In FIG. 34, the blank areas are electrically conductive while the shaded areas are non-conductive and therefore heat is generated in these areas. This thermal head is characterized in that the remotest heating elements 354a and 354f are not connected to a common line 341.

FIG. 35 is a schematic diagrammatic illustration of the operation of detecting a perforation of the film in order to write data on an area of the film as indicated in FIG. 29.

Referring to FIG. 35, a stray capacitance will be generated between two adjacent ones of the heating elements 354a through 354f of the thermal head 1. Take, for instance, the heating element 354a at a remote end that is not connected to the common line 341 and which will show a stray capacitance between the heating element 354b located next to it. The generated stray capacitance will vary under the influence of the dielectric constant of the film base which comes in touch with it.

Thus, the stray capacitance will be increased when it is held in contact with a film and reduced when there is no film in contact with it. If, now, a high frequency wave is added to the signal line 340, the high frequency wave is induced into the heating element 354a having an open end by the stray capacitance.

Similarly, the high frequency wave will also be induced into the heating element at the other remote end. The degree of induction of the high frequency wave will be large when the film is held in contact with the thermal head to raise the dielectric constant, whereas it will become small when the thermal head is located in a perforation of the film to reduce the dielectric constant.

Thus, a reduction in the level of the high frequency signal induced into the remotest heating elements having an open end tells that the thermal head is now in a perforation. The perforation will be more accurately detected by using an adder 350a and adding the two high frequency signals from the two remotest heating elements. The dielectric constant of the film base will also vary depending on its physical and chemical condition.

It should be noted that the dielectric constant of the film base will remarkably change at or near the glass transition temperature. In this embodiment, the change in the dielectric constant and the fact that the two remotest pits are used for SYNC·SYNC' signals which are alternately generated while data are being recorded are utilized and the signals from the two remotest heating elements are applied to a subtracter 350b to obtain the difference of the two in order to find out if the film base has reached a glass transition temperature at a point corresponding to either one of the two heating elements.

The coil 351 and the capacitor 353 in FIG. 35 are used to add a high frequency signal to a data writing signal. Then, the high frequency output 1 from the adder 350a will tell if the film base is currently in contact with the thermal head or not whereas the high frequency output 2 from the subtracter 350b will tell if a data writing operation is completed or not.

Figure 36:
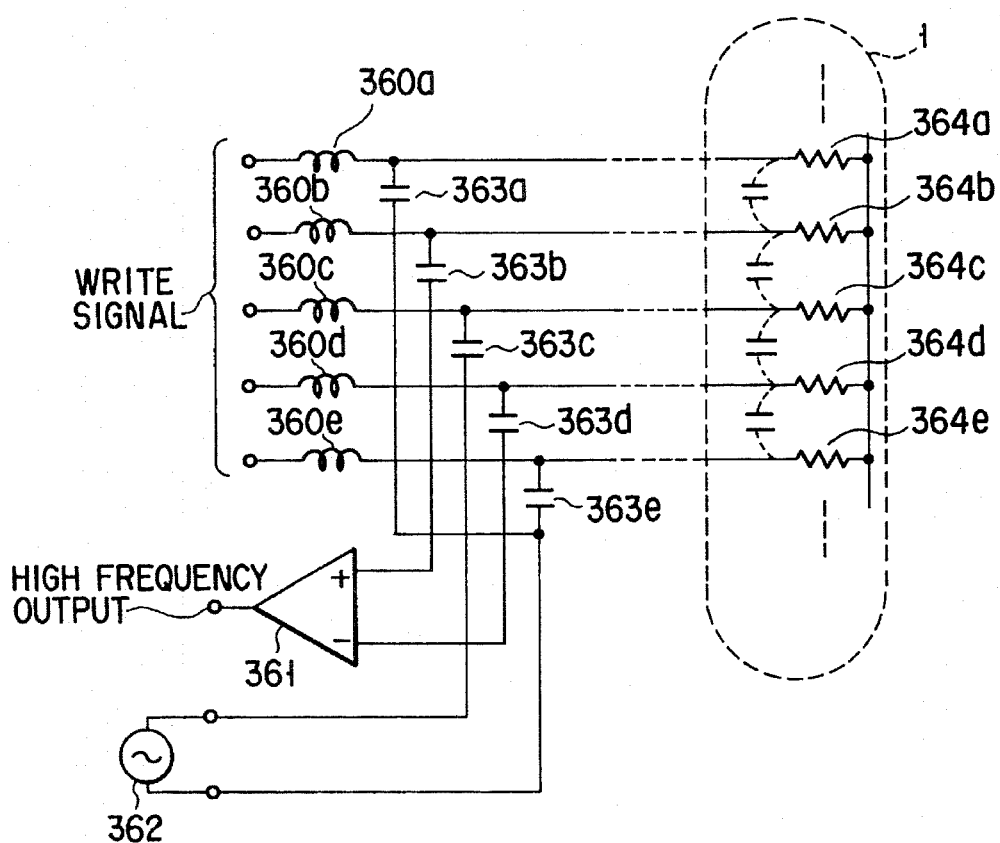
FIG. 36 is a schematic circuit diagram of a circuit for detecting a condition where the film base shows the phenomenon of glass transition without using heating elements having an open end.

FIG. 36 is a schematic circuit diagram of a circuit for detecting a condition where the film base shows the phenomenon of glass transition without using heating elements having an open end.

As shown in FIG. 36, five consecutively arranged heating elements are selected from the group of heating elements and a Wheatstone bridge is formed out of them by utilizing stray capacitances, which are so balanced as to induce high frequency waves. The induced high frequency waves are by turn applied to a subtracter.

Assume that one of the five heating elements shows a state different from those of the remaining elements, indicating that it is ready for forming pits. Then, the Wheatstone bridge will become off balanced and the subtracter 361 will output a high frequency signal. Consequently, it will be determined if any of the five heating elements is ready for forming pits by detecting the high frequency signal so that the operation of the thermal head can be controlled by utilizing such high frequency signals.

Now, the operation of the above described first embodiment of data recording unit of the invention will be described in greater detail.

Referring to FIG. 5, a film cartridge is loaded into the film cartridge chamber 13 and the leading edge of the film is fed into the film take-up chamber 18 to make the film 22 ready for shooting when the camera back 25 as illustrated in FIG. 7 is put on the camera to close the latter, the thermal head 1 comes down to the position indicated by 14 in FIG. 5 to pinch the film with the platen roller 15.

Then, the film 22 is accurately set in position by the guide pin 16 and the film rails 20a and 20b and fed forward, whenever appropriate, by the roller in the film take-up chamber and the film feed roller 17. Now, data can be recorded on the film base at low positions as indicated in FIG. 3 by controlling the temperature of the heating elements by way of the thermal head 1.

More specifically, when the camera back 25 as illustrated in FIG. 7 is closed, the heat radiating plate 29 that carries the thermal head 1 is pressed against the platen roller 15 and the thermal head guide pins 21a and 21b illustrated in FIG. 5 place the heat radiating plate 29 accurately in position by utilizing its reference hole. The spring 31 presses the thermal head 1 against the film 22 with a sufficient pressure.

while the thermal head module is accurately set in position by the thermal head guide pins 21a and 21b as described above, it is desirable for the thermal head module to be able to shift its position to some extent. To meet this requirement, a relatively large gap is provided between the camera back 25 and an end area of the heat radiating plate 29 that surrounds the pin 30 for anchoring the heat radiating plate 29 and an adhesive rubber heat sink 34 is placed in the gap between the camera back 25 and the heat radiating plate 29 to allow the thermal head module to shift its position to a certain extent.

The heat radiating plate 29 is so formed that, when the thermal head 1 abuts the platen roller 15, it is slightly inclined (by angle θ as shown in FIG. 9) from a horizontal line and yet the heating sections of the thermal head 1 squarely touch the film 22 in order for the film to be prevented from scraping the thermal head 1 and the flexible base plate 36 at the area where they are bonded together.

The thermal head 1 can be damaged by thermal shock when it is heated while it is carrying dew drops on it. The dew sensor 37 detects whatever dew drops that may be lying on the back of the pressure plate, stops the ongoing data recording operation and turns on the dew indicator lamp.

Even dew formed when a cooled film 22 is loaded into the camera will be collected locally by way of the pressure plate and absorbed by the water absorbent member 33. Since the water absorbent member 33 is fitted to a part of the dew sensor 37, the water absorbed by the absorbent member 33 can be detected by the dew sensor 37, which by turn stops the ongoing data recording operation and turns on the dew indicator lamp.

Since the thermal head 1 is located close to the film cartridge chamber and up stream to the film window in the above described embodiment of data recording unit of the invention, data can be recorded for the last frame of the film.

Since each frame is used to take a picture after related data are recorded on it, the unit does not need to temporarily store the data until the film is fed forward for the next frame unlike the case where the thermal head 1 is located close to the film take-up chamber, allowing the CPU to be equipped with a reduced memory capacity.

Now, a second embodiment of data recording unit of the present invention will be described by referring to FIG. 37.

FIG. 37 is a schematic elevational view of a camera incorporating the second embodiment of data recording unit of the invention.

Reference will be made only to those portions of this second embodiment that are different from the corresponding portions of the first embodiment and description of the remaining portions will be omitted.

Referring to FIG. 37, in this second embodiment, the thermal head for recording data is located opposite to that of the first embodiment relative to the film window. In other words, this embodiment is characterized by that the lower half member 15 of the film feed roller 17 is used as a platen roller and the thermal head position 14 is found to the left of the platen roller 15.

With such an arrangement, since the thermal head position 14 is located close to the film take-up chamber 18, the data to be recorded needs to be temporarily stored until the film is set in position for data recording. The film 22 is fed forward by the film feed roller 17 and then taken up by a film take-up roller (not shown) in the film take-up chamber 18.

Since the area for data recording where the thermal head position 14 and the platen roller 15 are arranged in this embodiment is located close to the film take-up chamber 18, the operation of the shutter unit which is normally disposed near the platen roller 15 of the first embodiment is not subjected to any restrictions related to data recording, making the design of the embodiment relatively simple and easy.

The total number of parts of this embodiment can be reduced as the film feed roller 17 is partly used for a platen roller 15, allowing the camera to be further downsized.

A third embodiment of data recording unit of the present invention will be described by referring to FIG. 38.

FIG. 38 is a schematic elevational view of a camera incorporating the third embodiment of the data recording unit of the invention.

This embodiment resembles the second embodiment in terms of the data recording position but differs from the latter in that the thermal head 1 is oppositely directed. Since the arrangement of the thermal head 1 and related components surrounding it is the same as that of the second embodiment, they will not be described any further.

With this embodiment, as the camera back 25 as illustrated in FIG. 7 is fitted to the camera body to close the latter, the heat radiating plate 39 that carries the thermal head 1 and is illustrated in FIGS. 6 and 9 is pressed against the platen roller 15. Consequently, the heat radiating plate 29 is accurately set in position by the head guide pins 21a and 21b because of the provision of the reference hole of the heat radiating plate 29. The spring 31 presses the thermal head 1 against the film 22.

while the thermal head module is accurately set in position by the thermal head guide pins 21a and 21b as described above, it is desirable for the thermal head module to be able to shift its position to some extent. To meet this requirement, a relatively large gap is provided between the camera back 25 and an end area of the heat radiating plate 29 that surrounds the pins 21a, 21b for anchoring the heat radiating plate 29 and an adhesive rubber heat sink 34 is placed in the gap between the camera back 25 and the heat radiating plate 29 to allow the thermal head module to shift its position to a certain extent.

The heat radiating plate 29 is so formed that, when the thermal head 1 abuts the platen roller 15, it is slightly inclined from a horizontal line and yet the heating sections of the thermal head 1 squarely touch the film 22 in order for the film to be prevented from scraping the thermal head 1 and the flexible base plate 36 at the area where they are bonded together.

As described above, the thermal head 1 of this third embodiment of the data recording unit of the present invention is pressed against the film from the downstream of the movement of the film so that the film is least liable to be damaged as it is not scraped by anything but the heating elements of the thermal head.

Unlike the above second embodiment in which the angle of the film 22 relative to the platen roller 15 may vary when the film 22 is taken up, this third embodiment will scarcely show such changes in the angle between the film 22 and the platen roller 15 so that the operation of data recording can be carried out in a stable manner.

As embodiments of the data recording unit of the invention have been described above, some embodiments of the data reproducing unit of the invention will now be described.

Firstly a first embodiment of a film data reproducing unit of the present invention will be described by referring to FIGS. 39 through 60.

Figure 39:
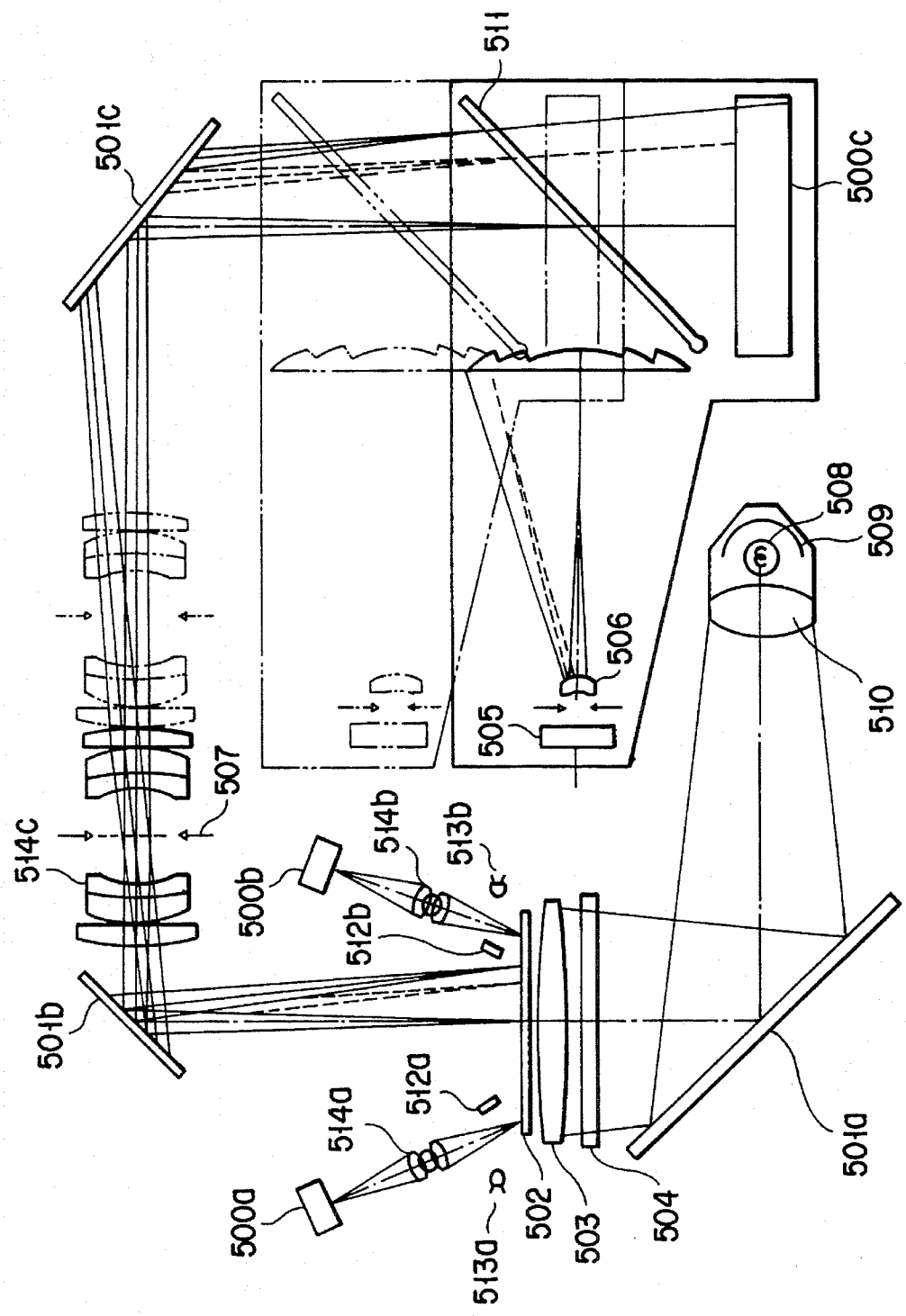
FIG. 39 is a schematic diagrammatic view showing the configuration of a first embodiment of a data reproducing unit for retrieving data on a film recorded by the first embodiment of the data recording unit of FIG. 5.

FIG. 39 is a schematic diagrammatic view showing the configuration of the first embodiment of a data reproducing unit, which is in fact a combination of a unit for reading encoded digital data on the film base and an image scanner for electrically retrieving the image on the film.

This embodiment will be described below by referring specifically to FIGS. 39 and 40.

Figure 40:
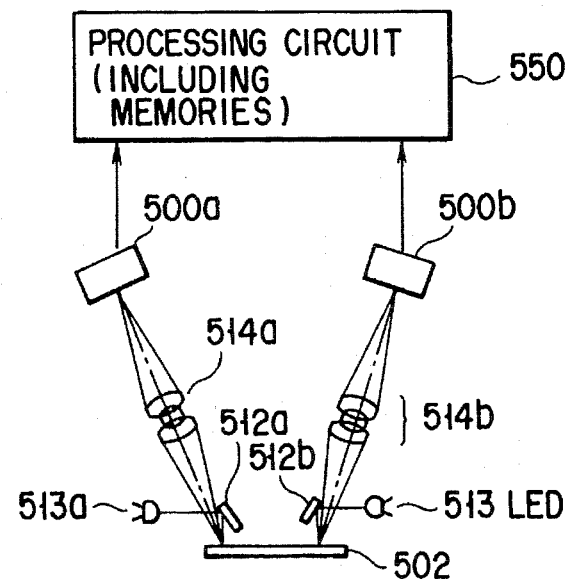
FIG. 40 is a schematic diagrammatic view of the detector for reading encoded digital data stored on a film.

FIG. 40 is a schematic diagrammatic view of the detector of the embodiment for reading encoded digital data stored on the film base of a film.

As illustrated in FIG. 39, a light source lens 510 and a mirror 501a are arranged on the path of rays of light emitted from a halogen lamp 508 with a reflector 509 that serves as a light source and an infrared radiation cut filter 504, a converging lens 503 and a film 502 are disposed on the path of rays of light reflected by the mirror 501a.

A mirror 501b, a data detecting optical system 514c, a mirror 501c are disposed downstream to the film 502 on the light path and a return mirror 511 is arranged on the path of rays of light reflected by the mirror 501c.

Then, a monitor optical system 506 and an area sensor 505 are disposed on the path of rays of light reflected by the return mirror 511.

On the other hand, mirrors 512a and 512b are arranged on the respective paths of rays of light emitted from light emitting diodes (LEDs) 513a and 513b and a film 502 is disposed on the paths of rays of light reflected by the mirrors 512a and 512b.

Line sensors 500a and 500b are disposed on the respective paths of rays of light reflected by film 502 with data detecting optical systems 514a and 514b respectively arranged therebetween.

A pair of combinations of a line sensor, a data detecting optical system and a mirror are provided because data are recorded on both the upper and lower surfaces to the film.

With a unit having a configuration as described above, rays of light emitted from the light source 508 pass through the converging lens 503 and the infrared radiation cut filter 504 and irradiate the film 502.

When the return mirror 511 is in the illustrated position, the image recorded on the film 502 is picked up by the field lens, relayed by the monitor optical system 506 and then projected on the area sensor 505 before it is displayed on a monitor screen.

As the return mirror 511 rotates to allow rays of light proceed to the line sensor 500c, image signals become detectable.

Rays of infrared radiation from the LEDs 513a and 513b are, on the other hand, reflected by the mirrors 512a and 512b, irradiate the surface of the film base and then mirror reflected by the film base if no pits are formed there.

If, however, the film base carries pits on it, they are irregularly reflected there and get to the data detecting optical systems 514a and 514b disposed in respective positions slightly deviated from the angle of mirror reflection before they form pit images on the line sensors 500a and 500b.

Thus, as the image scanner scans to pick up pit images from the film 502 and the film 502 is moved correspondingly, the picked up pit images are sequentially reproduced on the line sensors 500a and 500b.

Output signals of the line sensors 500a and 500b that contain the data retrieved from the film base are then decoded by a processing circuit 550 as the data containing data on the average of movement of spots, which will be described hereinafter.

Now, the image scanner will be described in detail.

A developed film that carries images is either a positive film showing the objects substantially accurately reflecting the original colors and degrees of brightness or a negative film expressed in complementary colors and reciprocal degrees of brightness. An image scanner normally reproduces the image it has picked up by using a color spectral filter that breaks down the color into three primary colors (red, blue and green).

If, however, a negative film is involved, the data collected from the image of the film need to be subjected to a translation process because the colors of a negative film are constituted by a system of three complementary colors of cyan, magenta and yellow and the filter for the primary color system of red, blue and green cannot be adapted to it.

Therefore, if the color spectral filter of the scanner for the three primary color system can be replaced by an alternative filter for the system of three complementary colors of cyan, magenta and yellow, the cumbersome translation process normally involved there will be eliminated to remarkably simplify the overall operation and reduce the cost.

Now, a color spectral filter system that can solve the above problem involved in an image scanner for color images will be described by referring to FIGS. 41 through 44.

Figure 41:
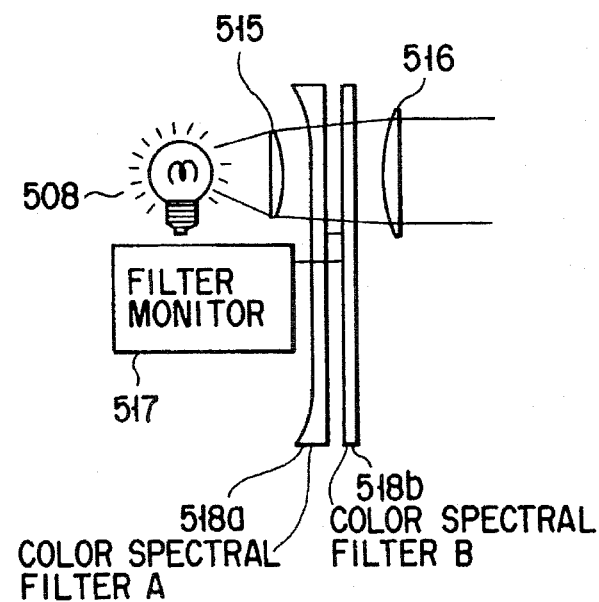
FIG. 41 is a schematic diagrammatic illustration showing how the image scanner of the unit of FIG. 40 adapts itself to a color image by means of its color spectral filters.

FIG. 41 is a schematic diagrammatic illustration showing the entire color filter system that comprises a pair of color spectral filters 518a and 518b incorporated into a light source section and a filter motor 517 for switching the color spectral filters, a halogen lamp 508, light source lenses 515 and 516, the color spectral filters 518a and 518b and said filter motor 517 being disposed between said light source lenses 515 and 516, the halogen lamp 508 and the light source lenses 515 and 516 constituting a light source section.

FIGS. 42A and 42B respectively illustrate the color spectral filters A518a and B518b. These are, in fact, a pair of discs, on each of which three films of different colors of cyan, magenta and yellow are arranged. The filter motor 517 causes the three films to sequentially cross the luminous flux produced by the light source lenses 515 and 516.

By changing the sense of rotation of the filter motor 517, the color additive type spectral filter is switched to the color subtractive type spectral filter and vice versa as illustrated in FIGS. 43 and 44. Thus, as filters of different types can be used by simply changing the sense of rotation of the filter motor, the system has a simplified configuration and requires only few operations to maneuver it properly.

FIG. 45 shows a cubic color filter system that can alternatively be used for the unit of FIG. 40. This system comprises a cubic filter block 520, a filter motor 517 for rotating the filter block around a diagonal axis, a filter frame 519 for supporting said filter motor 517 and the filter block 520 and a filter switching motor 521 for rotating the filter frame 519 for selection of a particular filter.

FIG. 46A is an extended schematic plan view of the filter block 520. With the arrangement of filters of FIG. 46A, a set of filters of complementary colors can be realized by causing a luminous flux to perpendicularly hit a surface of the filter block. Any particular one of these filters can be selectively used by rotating the frame by means of the filter motor 517.

When the filter switching motor 521 is turned by 45° to cause rays of light to hit an edge of the filter block 520, a set of color additive type filters as illustrated in FIG. 46C will be realized because rays of light pass through different complementary color filters. In this case again, any particular one of the filters can be selectively used by rotating the frame by means of the filter motor 517.

Figure 47:
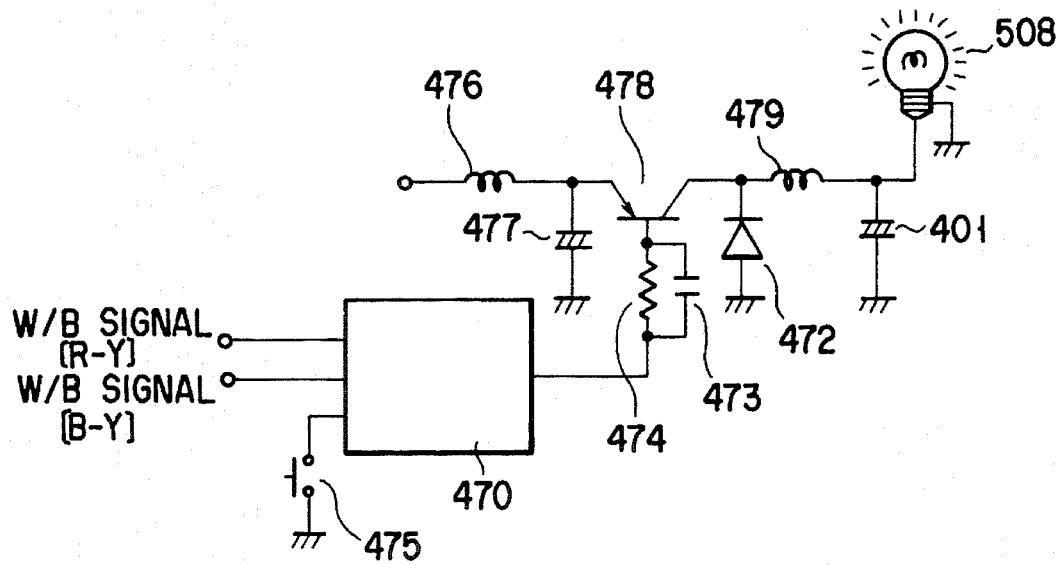
FIG. 47 is a schematic circuit diagram of the light source of the image scanner of the unit of FIG. 40 that can change its color temperature.

FIG. 47 is a schematic circuit diagram of the light source of the image scanner of the unit of FIG. 40 that can change its color temperature.

It will be seen from FIG. 47 that a developed color film produces chromatic divergence as a function of the locus of color temperature on the chromaticity diagram that may vary depending on the condition of the light source under which the picture is taken. Various techniques are known to correct the chromatic divergence, which is often referred to as color temperature correction.

One of such techniques uses filters. This technique requires a vast number of filters if a fine color temperature correction needs to be carried out.

Another one involves the use of varied quantities of light for different colors in color spectral operation. This technique is accompanied by the problem of requiring a large apparatus for changing the quantity of light, which is not very responsive in motion.

Still another technique involves integration of the quantity of light for different periods of time for different colors or the use of varied gains for different colors in the amplifier. It will be accompanied, however, by the problem of limited scanning speed and degraded dynamic range and S/N ratio.

The above mentioned techniques are also problematic because they require an adjustment operation of some sort or another to provide changes in the quantity of light for adapting to the locus of color temperature.

According to the invention, the above problems are bypassed by using a technique of color temperature correction that utilizes light of a halogen lamp which is so controlled as to move along the locus of color temperature by changing the voltage applied to the halogen lamp.

Referring to FIG. 47, as the color temperature correction set switch 475 of the controller 470 is depressed, the controller 470 controls the voltage of the light source 508 by means of a W/B signal [R-Y] and a W/B signal [B-Y]. Since the light from the halogen lamp 508 changes on the locus of color temperature by this simple operation, no complicated arithmetic operations are involved in this technique of color temperature correction.

Figure 48:
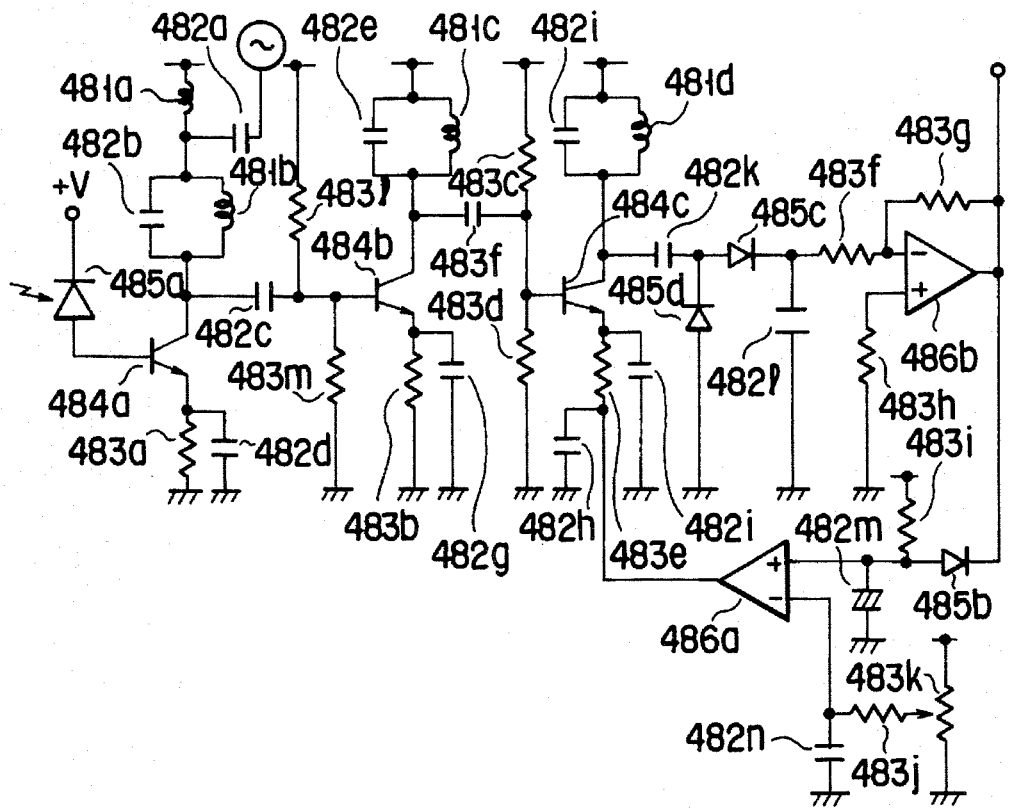
FIG. 48 is a schematic circuit diagram of the circuit for detecting signals from the photodiode sensor of the unit of FIG. 40 rapidly and accurately with a low noise level.

FIG. 48 is a schematic circuit diagram of the circuit for detecting signals from the photodiode sensor of the unit of FIG. 40 rapidly and accurately with a low noise level.

With the circuit of FIG. 48, rays of light that reach the photodiode sensor 485a from an image on the film flow into the base of the transistor 484a as a photoelectric current. Since a high frequency current containing a DC added thereto is applied to the collector of the transistor 484a, the high frequency current is subjected to amplitude modulation by the photoelectric current of the photodiode sensor 485a.

Then an initial amplification is carried out by a first-step high frequency amplifier circuit and a second-step high frequency amplifier circuit. These circuits for initial amplification have a feature of a high amplification factor and a low noise level because noises due to heat generated by resistors in the circuits are minimized by the use of a tank circuit in place of a collector resistor for direct current amplification which is normally used in high frequency amplifiers.

Thereafter, the high frequency component of the signal is removed by a voltage doubler circuit to retrieve a signal representing the original photoelectric current in an amplified form. The image signal in the form of an amplified photoelectric current is then made to pass through a buffer amplifier which may be an operational amplifier to produce the original image signal.

A circuit for removing the bias contained in the signal is also provided. Since the bias value can be controlled by this circuit, a phenomenon of saturated amplifier can be prevented from occurring in the next stage of amplification. The signal detection circuit comprising an image scanner, a filter switching system and a photodiode sensor for controlling white balance will not be described any further because it does not constitute the essential part of the present invention.

The first embodiment of data reproducing unit of the present invention having a configuration as described above operates in a manner described below.

Figure 49:
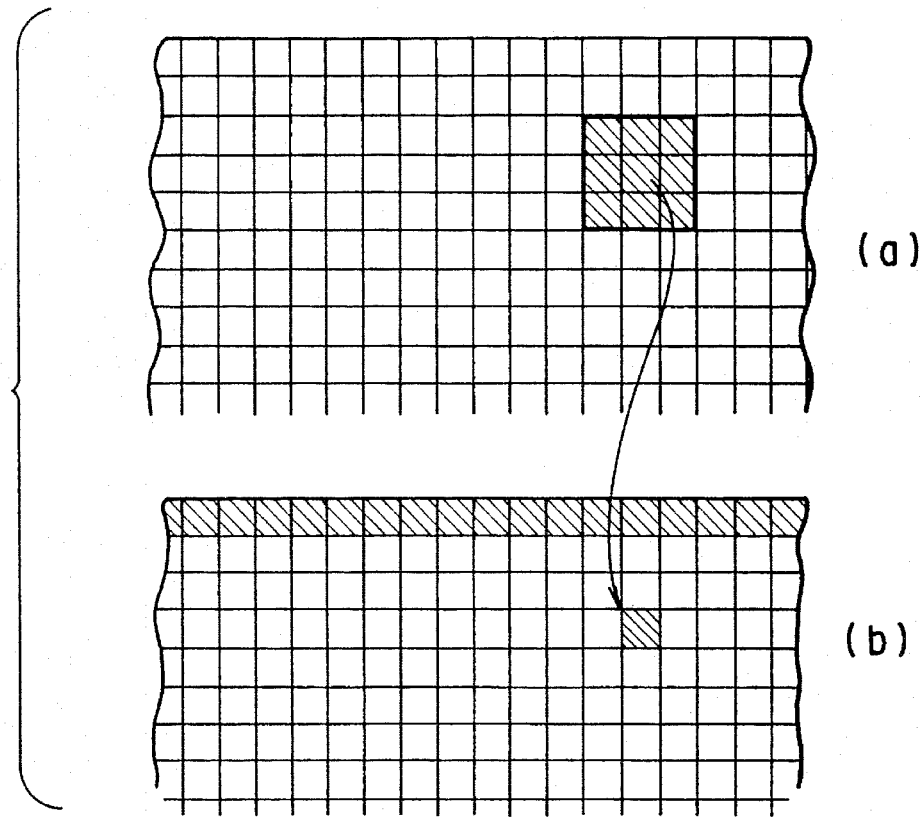
FIG. 49 is a schematic diagrammatic illustration showing how data are stored in a predetermined location after an arithmetic operation of determining the mean movement in an area of 3×3 meshes of memory map.

FIG. 49 is a schematic diagrammatic illustration showing how data are stored in a predetermined location after an arithmetic operation of determining the mean movement for encoded digital data in an area of 3×3 meshes of a memory map. The mean movement calculated for the 3×3 meshes of network (a) is then stored in the location of network (b) of FIG. 49.

Figure 50:
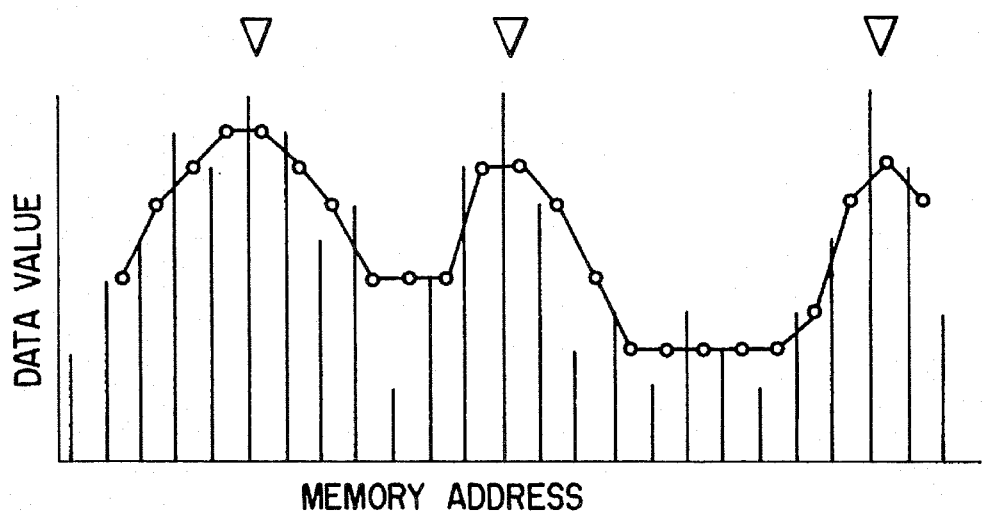
FIG. 50 is a graph showing the relationship between the data value and the memory address before and after an arithmetic operation of determining the mean movement.

FIG. 50 is a graph showing the relationship between the data value and the memory address before and after an arithmetic operation of determining the mean movement. The bars and the curved or broken line in FIG. 50 respectively represent values before and after an arithmetic operation.

By averaging movements, minute undulations are smoothed to make digital signals distinguishable. Thus, pit positions can be identified by detecting local maximum points as indicated by triangles pointing downward in FIG. 50.

Figure 51:
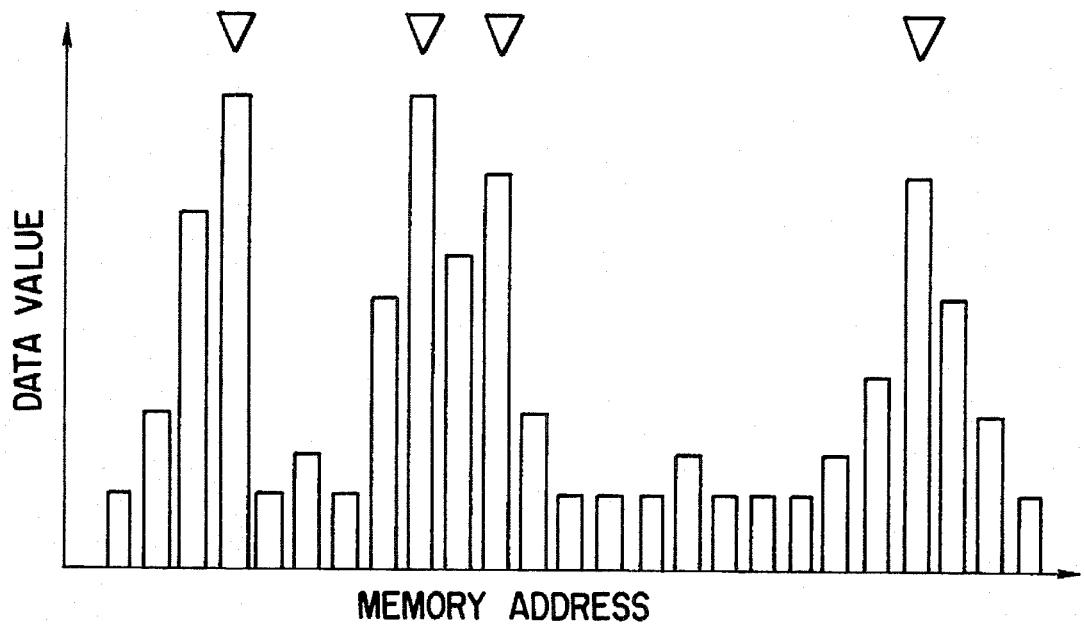
FIG. 51 is a graph showing the relationship between the data value and the memory address obtained by an arithmetic operation of determining the mean movement covering an area other than that of FIG. 49.

FIG. 51 is a graph showing the relationship between the data value and the memory address obtained by an arithmetic operation of determining the mean movement covering an area other than that of FIG. 49. The data between the second and third leftmost local maximum points in FIG. 51 represent a noise that could not be removed by the operation of determining the mean movement.

Figure 52:
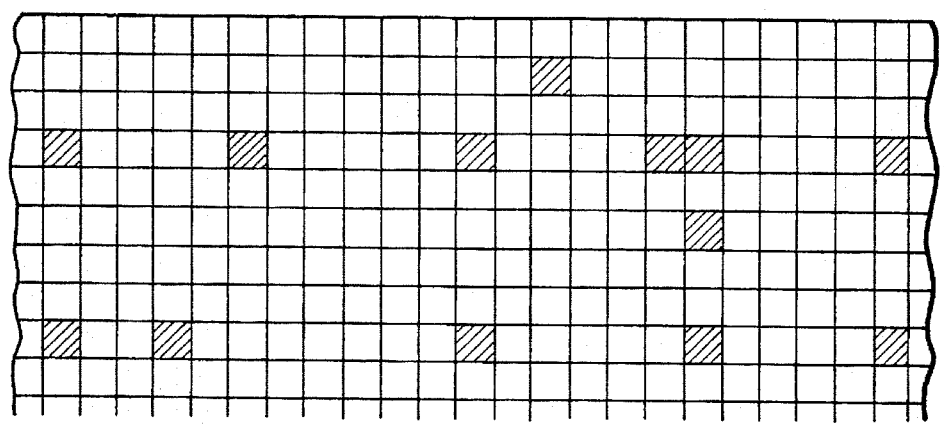
FIG. 52 is a schematic diagrammatic illustration showing local maximum points.

FIG. 52 is a schematic diagrammatic illustration showing local maximum points and FIG. 53 is a schematic diagrammatic illustration similar to FIG. 52 but obtained by turning FIG. 52 clockwise by 90°. A diagram Of distribution of local maximum points as illustrated in FIG. 53 can be obtained by extending FIG. 53 longitudinally.

The graph (a) in FIG. 54 is a schematic diagrammatic illustration showing the distribution of maximum points obtained by longitudinally extending the diagram of FIG. 53.

Note that the direction of extension corresponds to the horizontal direction in the film of FIG. 3 and, therefore, the horizontal lines in the graph (a) of FIG. 54 become vertical in the film of FIG. 3, where the overall width of rows of pits, the interval between two adjacent pits and the total number of bits should remain constant.

Thus, if all intervals between pits and the number of pits that are currently known are allocated to the graph (a) of FIG. 54, square sums of deviations from target points can be obtained as illustrated in the graph (b) of FIG. 54. Here, the range covered by a deviation square sum is defined to be a half to the next pit and the obtained deviation square sums are expressed by the respective figures at a side of the graph (b) of FIG. 54.

Figure 55:
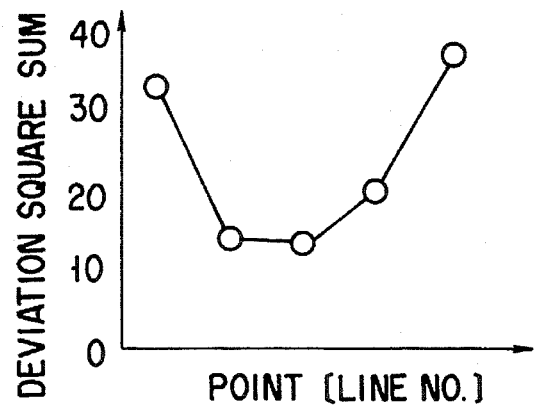
FIG. 55 is a graph showing the relationship between the deviation square sum and the spot of the distribution of FIG. 54.

FIG. 55 is a graph showing the relationship between the deviation square sum and the point for the distribution of FIG. 54. As seen from FIG. 55, the third figure of deviation square sum from the top in (b) of FIG. 54 shows the smallest value. So the corresponding points are indicated in the graph (b) of FIG. 54 by triangles pointing upward.

Figure 56:
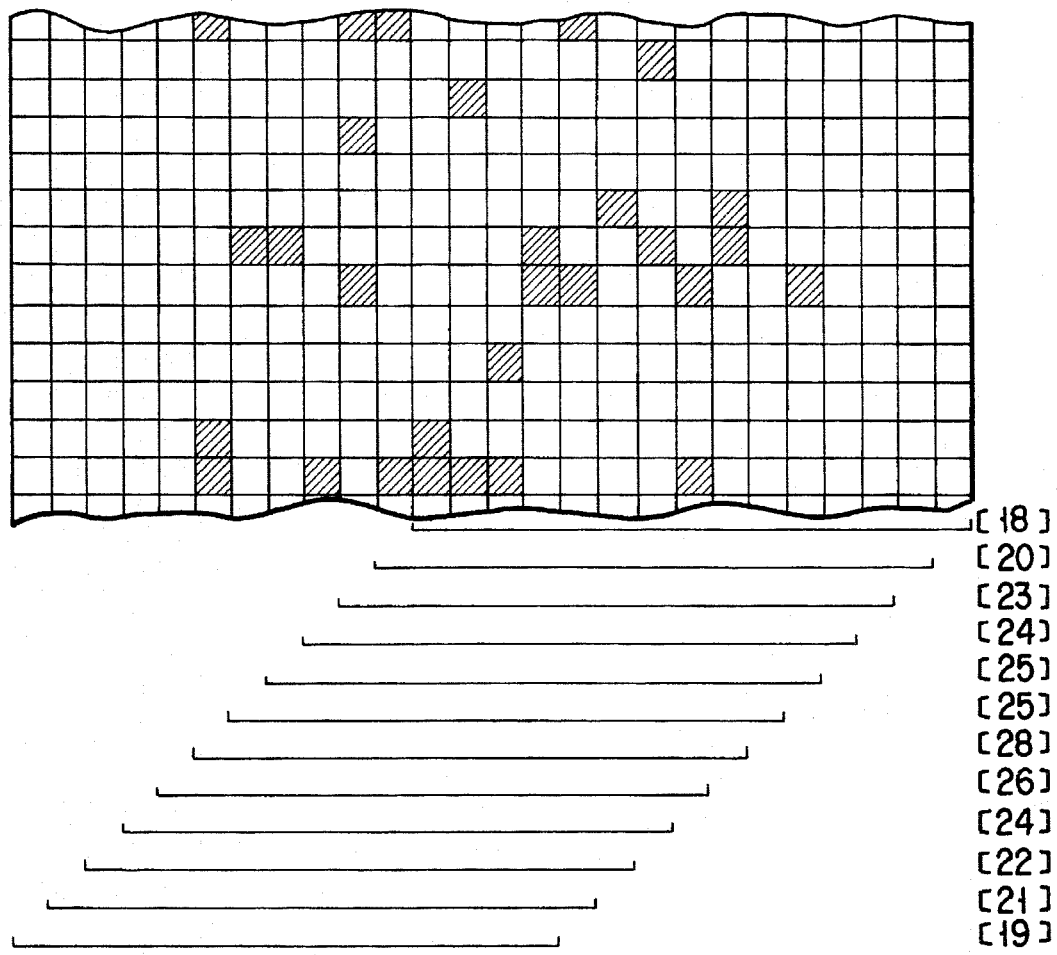
FIG. 56 is a diagram showing the result of an operation of horizontally adding data at points indicated by the triangles pointing upward in FIG. 54.

FIG. 56 is a diagram showing the result of an operation of horizontally adding data at points indicated by the triangles pointing upward. Since the maximum number of rows of data is 15 in the lateral direction of FIG. 56, a combination that produces the largest number of shaded meshes within each 15 rows of data is determined. The figures in FIG. 56 show the number of shaded meshes for each combination.

FIG. 57 is a graph showing the number of shaded meshes for each selected 15 rows. The 15 rows that show the largest number of shaded meshes the FIG. 57 are indicated by an emphasized line in FIG. 56.

Now that the positions of the pits formed on a film in a manner as shown in FIG. 3 are vertically identified, they are illustrated in FIG. 58 in the form of a network having fifteen vertical meshes. Note that the pits are not horizontally identified yet in FIG. 58.

Figure 59:
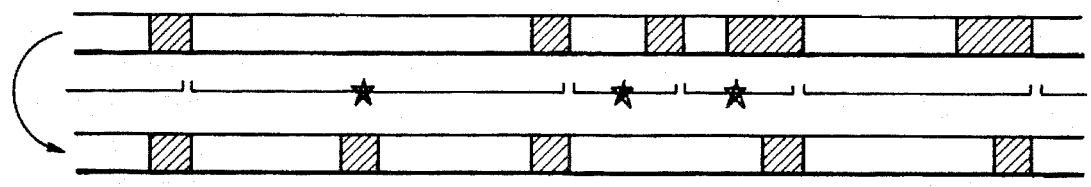
FIG. 59 is a schematic diagrammatic illustration showing how SYNC·SYNC' signals are detected and corrected.

The upper half of FIG. 59 is a schematic diagrammatic illustration showing an operation of detecting SYNC·SYNC' signals, where any detected shaded areas are also indicated by shaded markings. Any intervals between shaded areas that are remarkably greater or smaller than others are indicated by an asterisk in FIG. 59. Each of these irregular intervals are then either divided into two halves or added to a similar one to find out if it approximates neighboring ones for the purpose of correction. The lower half is obtained after such corrective measures are taken.

Now, the lower half of FIG. 59 is used as a set of synchronizing signals to extract digital data from FIG. 58. One of the signals closest to each of the shaded meshes is used as the synchronizing signal for the mesh. If two shaded meshes are incidentally found close to the SYNC-SYNC' signal position, the one closer to the signal position is selected. If the signal intensities of the two are stored, the one with a stronger intensity is selected.

Figure 60:
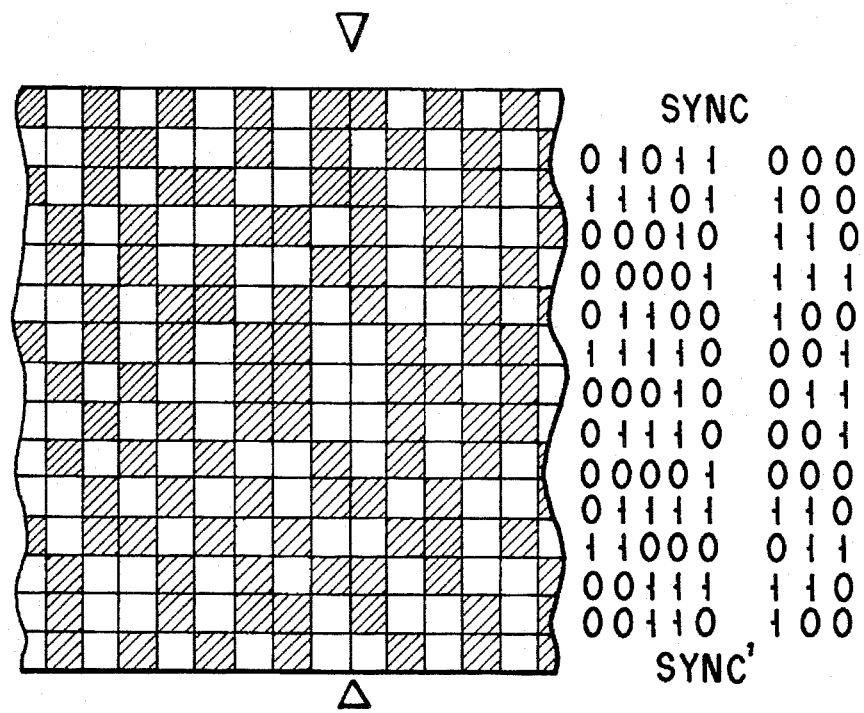
FIG. 60 is a schematic diagrammatic illustration showing extracted signals.

FIG. 60 is a schematic diagrammatic illustration showing the signals obtained by the above described operation of extraction.

The binary signals obtained from the extracted signals are shown on the right side in FIG. 60.

The space between two blocks of binary signals in FIG. 60 represents a shift of phase of 180°, which takes place along a line indicated by two oppositely disposed triangles pointing downward and upward respectively in the left half of FIG. 60.

Now, a second embodiment of data recording unit of the present invention will be described by referring to FIGS. 61 through 63.

Figure 61:
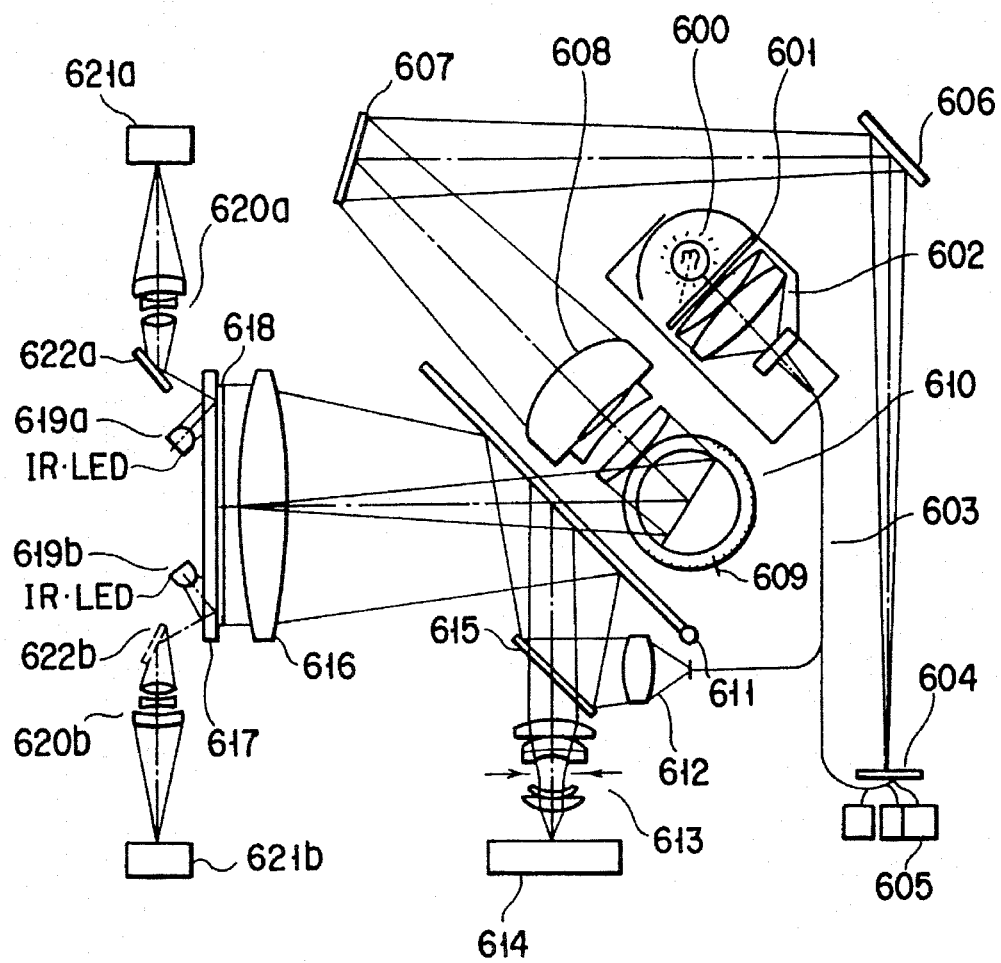
FIG. 61 is a schematic diagrammatic view similar to FIG. 39 but showing the configuration of a second embodiment of a data reproducing unit for retrieving data on a film recorded by the second embodiment of the data recording unit of FIG. 37.
Figure 62:
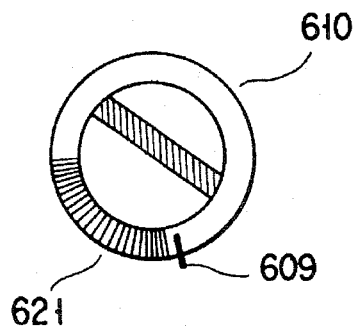
FIG. 62 is a schematic plan view, showing in greater detail the configuration of the rotary mirror 610 of FIG. 61.

FIG. 61 is a schematic diagrammatic view similar to FIG. 39 but showing the configuration of the second embodiment of a data reproducing unit for retrieving data on a film.

Referring to FIG. 61, an infrared radiation cut filter 601 and a light source lens 602 are arranged on the path of rays of light from a halogen lamp 600. An optical fiber 603 that series as a light source is disposed on the path of rays of light converged by said light source lens 602 and a photodiode sensor 605 and mirrors 606 and 607 are arranged on the path of rays of light guided by the optical fiber 603.

Then, a rotary mirror 610 provided with a lens 608 and an encoder 609 is disposed on the path of rays of light reflected by said mirror 607. The encoder which is used for detecting the principal scanning position is provided with a stripe pattern 621 having stripes that are equally spaced on the film surface.

A return mirror 611 and a distance correction lens define the path of rays of light that are reflected by said rotary mirror 610 and eventually reach a film 618.

Said photodiode sensor 605 is located on the image forming plane, or focal plane, where rays of light from the light source are converged to a single point by an optical fiber. An optical fiber 603 for conducting light from the light source is arranged near the optical fiber extending from the photodiode sensor 603 at the image forming plane and longer than the latter optical fiber.

Rays of light guided by said optical fiber are also led to an area sensor and a light source lens 612 for the area sensor and a half mirror 615 are disposed on their path. Then, a return mirror 611 is disposed on the path of rays of light reflected by said half mirror 615 and a lens 616 for distance correction is arranged on the path of rays of light reflected by said return mirror 611 before they get to the film 618.

The film 618 is, on its part, also found on the paths of rays of light emitted from respective light emitting diodes 619a and 619b.

Rays of light reflected and scattered by said film 618 are then reflected by mirrors 622a and 622b and detected by line sensors 621a and 621b after passing through respective data detecting optical systems 620a, 620b.

A pair of combinations of a line sensor, a data detecting optical system and a mirror are provided because data are recorded on both the upper and lower surfaces of the film.

With a unit having a configuration as described above, rays of light emitted from the halogen lamp 600 pass through the infrared radiation cut filter 601, the light source lens 602 and are then guided by the optical fiber 603 for the light source, which projects them from a position slightly separated from the image forming plane so that they are reflected by the mirrors 606 and 607. The reflected rays of light are then reflected again by the rotary mirror 610 and, after passing through the distance correction lens 616, form a blurred image on the film surface.

Rays of light that pass through the film 618 are then reflected by an IR pass mirror 617 and, after passing through the film 618 once again, proceed the same route in the opposite direction to pass through the distance correction lens 616, the rotary mirror 610, the lens 608 and the mirrors 606 and 607 and form an image on the image forming plane 604.

While the optical fiber projects a blurred image on the film surface, only a necessary area of the film is irradiated by rays of light to minimize the quantity of light consumed by the data reproducing operation and hence allow the unit to be further down sized.

Rays of light from the light emitting diodes 619a and 619b for infrared radiation are made to pass through the IR-pass mirror 617 and are then irradiated on the surface of the film base. The rays of infrared radiation that irradiate the surface of the film base are mirror reflected if no pits are formed there. If, however, the film base carries pits on it, they are irregularly reflected there and again by the mirrors 622a and 622b and get to the data detecting optical systems 620a and 620b disposed in respective positions slightly deviated from the angle of mirror reflection before they form pit images on the line sensors 621a and 621b.

Thus, as the image scanner scans to pick up pit images from the film 618 and the film 618 is moved correspondingly, the picked up pit images are sequentially reproduced on the line sensors 621a and 621b.

It should be noted that the rotary mirror 610 performs primary scanning or scanning in the direction along which the line sensors are arranged, whereas secondary scanning is carried out by moving the film as in the case of the first embodiment.

Since both the primary and secondary scanning operations are mechanically performed, the image forming lens 608 can always use images located on or near the optical axis to improve the image resolution, using a relatively small lens 608.

Since this embodiment involves the use of an image scanner, the distance correction lens 616 can constitute an obstacle if digital data are detected from the front surface of the film. This is why the data detecting system is arranged on the rear side of the film as illustrated in FIG. 61.

FIG. 63 is a schematic diagrammatic view similar to FIG. 61 but showing the configuration of a simplified embodiment obtained by eliminating the use of the return mirror 611 of the embodiment of FIG. 61 for the purpose of downsizing.

As illustrated, a rotary mirror 704 is disposed near the converging lens of the monitor optical system 709 of this embodiment. Thus, the luminous flux of the monitor optical system 709 is partly used by the rotary mirror 704 for the image scanner.

It should be noted that, with such an arrangement, the image scanner can be moved simultaneously with the monitor to reduce the time required for a data retrieval operation. With this arrangement, on the other hand, the rotary mirror 704 excessively reflects light to produce flares on the monitor image depending on the angle of the mirror relative to the monitor. So, such excessive reflection of light may need to be eliminated by using the device shutter of the area sensor or some other appropriate means.

Since the date detecting optical system of the above described embodiment of the invention is disposed on the rear side of the film, it is free from any possibility of picking up the shadow of the data detecting optical system on the monitor. Additionally, the embodiment can be constructed to a very compact size.

As a number of embodiments of the data reproducing unit of the present invention were described above, now, an embodiment of the data writing unit for use after the development of film will be described by referring to FIGS. 64 through 71.

FIG. 64 is a schematic diagrammatic perspective view of an embodiment of a unit for recording encoded digital data on a developed film according to the invention.

In FIG. 64, a developed film 801 is accurately set in position by a pair of guide plates 800a and 800b and moved longitudinally from right to left by film feed rollers 804 and 805.

The film 801 is also pinched by a data recording thermal head 802 and a plates roller 803 and encoded digital data are written on the film as the thermal head is driven in synchronism with the movement of the film. Various method may be conceivable for detecting the location where data are written, including a method of visually detecting the location and a method of providing a sensor for detecting an edge of the recorded picture on the guide plate 800a or 800b.

The thermal head 802 may be driven by means of a drive circuit and a drive method like those described earlier by referring to the embodiments of data recording unit. While the film feed rollers 804 and 805 are separated from the thermal head 802 in FIG. 64 for easy understanding of the overall configuration, data may be recorded from the first frame of the film if the rollers are disposed closer to the thermal head 802.

FIG. 65 is a schematic diagrammatic partial plan view of a 35 mm reversal film carrying encoded digital data before it is loaded onto a film mount specifically designed for the above embodiment.

The film shown in FIG. 65 is cut apart from the remaining portions of a long film after it is used for shooting and developed and is provided with holes punched out by a puncher for fitting it onto a film mount. Note that a camera that can use this type of film for taking pictures leaves a space between two adjacent frames which is wider than a space that an ordinary camera spares.

In FIG. 65, reference numerals 810a and 810b respectively denote a lower data recording area and an upper data recording area while reference numerals 812a and 812b denote a pair of circular pin holes for receiving a pair of corresponding film anchoring pins and reference numerals 811a and 811b denote a pair of slits to be used for receiving respective film anchoring pins 825a and 825b, these slits being capable of accommodating dimensional errors of film mounts to a certain extent.

FIGS. 66A, 66B and 66C show respectively a front view, a side view and a partial sectional view of a film mount to be used for the embodiment of FIG. 64 for securing holding on it a film as illustrated in FIG. 65.

The film mount comprises film anchoring pin 826a and 826b to be put into the circular pin holes 812a and 812b of a film and a pair of other film anchoring pins 825a and 825b to be put into the respective slits 811a and 811b of the film. After the film is placed on the film mount, upper and lower flaps having respective pin hole pairs 823a, 823b and 824a, 824b are folded on the film with the pin hole pairs 823a, 823b and 824a, 824b receiving the respective anchoring pin pairs 826a, 826b and 825a, 825b to close the mount and securely hold the film therebetween.

FIG. 66C is a lateral view of the film mount when the flaps are folded on the base of the mount.

FIG. 67A is a schematic diagrammatic front view of the film mount of FIG. 66A when it is closed. The upper and lower flaps are provided on their outer surfaces with respective corrugated strips 830a and 830b, which are used to automatically feed the film mount when it is loaded on an image scanner, a digital data recording unit or a digital data reproducing unit.

FIG. 67B is a schematic diagrammatic rear view of the film mount of FIG. 66A when it is closed. As shown, it is provided along its upper and lower edges with respective guide rail receiving grooves 831a and 831b, which are also used when it is loaded on an image scanner, a digital data recording unit or a digital data reproducing unit.

The film mount is partly made of a material that is opaque when it is seen in visible rays of light but becomes transparent when it is seen in infrared radiation so that the digital data recorded on the film can be read without dismounting it from the film mount as shown in FIG. 68.

FIG. 69 is a unit to be used for retrieving encoded digital data stored on a film illustrated in FIG. 65 and fitted to a film mount as illustrated in FIG. 68.

In FIG. 69, a film mount 907 fitted to the unit is pinched by mount feed rollers 904a and 904b and one of a pair of guide rails 906a and 906b and driven to move forward on the rails by the rotation of the mount feed rollers 904a and 904b because of engagement of the corrugated peripheral surfaces of the rollers and the corresponding corrugated strip 830 of the film mount 907.

When the film mount is moved directly under a data detecting optical system 901 arranged above the guide rails, the film mount becomes partly transparent in infrared radiation that the infrared LED 903 of the optical system emits so that an image of the pits on the film is projected onto the line sensor 900 of the optical system.

Now, the digital data on the film can be reproduced by the method as described above by referring to the embodiments of data reproducing unit of the invention. The mask 902 in FIG. 69 is designed to intersect mirror reflected rays of infrared radiation emitted from the infrared LED 903 so that they may not enter the data detecting optical system 901.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A data recording apparatus for a camera using a photographing film comprising:

a thermal head arranged along a film path of a camera and capable of closely contacting with a photographing film in the camera, said thermal head having a plurality of fine heating section means for forming shallow pits on the photographing film when energized to heat the photographing film, wherein the shallow pits do not extend completely through the thickness of the photographing film; and control means for controlling thermal conditions of said plurality of fine heating section means of said thermal head according to the data to be recorded on the photographing film.

2. A data recording apparatus according to claim 1, wherein said control means comprises means for recording encoded digital data represented by distances between shallow hollow recording pits formed on the photographing film in the camera by said fine heating section means.

3. A data recording apparatus according to claim 1, wherein said thermal head is arranged at a position corresponding to an edge of the photographing film in the camera.

4. A data recording apparatus according to claim 3, wherein said photographing film has perforations and said thermal head records said encoded digital data between two adjacent perforations.

5. A data recording apparatus according to claim 4, wherein said control means comprises means for warming said photographing film while said thermal head is passing by a perforation.

6. A data recording apparatus according to claim 1, wherein said thermal head comprises data recording section means for recording data on said photographing film, synchronous signal recording section means for recording synchronous signals to be used for synchronization of said data and said plurality of fine heating section means for recording said data and said synchronous signals.

7. A data recording apparatus according to claim 6, wherein said synchronous signal recording section means comprises first and second synchronous signal recording region means for recording said synchronous signals on at least two positions facing each other with a data recording section therebetween, said synchronous signals having phases shifted from each other.

8. A data recording apparatus according to claim 1, wherein said thermal head comprises a data recording section means for recording data on the photographing film, a parity recording section means for recording parities to be used for correction of said data and said plurality of fine heating section means for recording said data and said parities.

9. A data recording apparatus according to claim 1, wherein said control means comprises means for providing a given preliminary heating area preceding said data recording section on the photographing film for preliminarily heating said thermal head.

10. A data recording apparatus according to claim 9, wherein said control means comprises means for recording correction data in said preliminary heating area for correction of data.

11. A data recording apparatus according to claim 9, wherein said control means comprises means for recording data in said preliminary heating area for detecting any inclination of rows of pits representing said data at the time of retrieving said data.

12. A data recording apparatus according to claim 1, wherein said control means comprises means for driving said thermal head for duty cycles and keeping said thermal head at a given heating temperature.

13. A data recording apparatus according to claim 1, wherein said control means comprises means for detecting a perforation of the photographing film by applying a high frequency wave to a plurality of heating electrodes of said thermal head and detecting generated stray capacitances.

14. A data recording apparatus according to claim 1, wherein said apparatus further comprises a dew sensor disposed close to said thermal head, and said control means comprises means for prohibiting said thermal head from writing or reading data whenever said dew sensor detects a dew drop.

15. A data recording apparatus according to claim 1, wherein said apparatus further comprises a heat radiating member disposed close to said thermal head.

16. A data recording apparatus according to claim 1, wherein said apparatus further comprises a dielectric constant detecting means for detecting changes in the dielectric constant of said fine heating section means of said thermal head, and said control means includes means for controlling the heating operation of said fine heating section means according to the output of said dielectric constant detecting means.

17. A data recording apparatus according to claim 1, wherein said thermal head records signal pits in a direction substantially perpendicular to a direction of movement of the photographing film.

18. An optical apparatus using a photographing film comprising:

shooting means for exposing said photographing film to an object image;

encoding means for encoding data relating to at least one of said object image and exposure conditions; and pit-forming means for forming shallow pits on the photographing film at a position associated with said object image according to data from said encoding means.

19. An optical apparatus according to claim 18, wherein said pit-forming means comprises at least one of fine heating section and an array of fine heating elements.

20. An optical apparatus according to claim 19, wherein said encoding means encodes the data relating to at least one of said object image and exposure conditions into output data including a plurality of bits, and said pit-forming means forms a plurality of shallow pits on the photographing film by heating said fine heating sections or said array of fine heating elements according to the output data of said encoding means.

21. An optical apparatus according to claim 18, wherein said apparatus further comprises film feeding means for feeding the photographing film, and said pit-forming means forms the pits when said film feeding means feeds the photographing film.

22. An optical apparatus according to claim 21, wherein said apparatus further comprises detecting means for detecting a feeding state of the photographing film, and said pits-forming means detects a predetermined position of the photographing film according to an output of said detecting means and forms a plurality of shallow pits from said predetermined position according to an output of said encoding means.

23. An optical apparatus according to claim 22, wherein said pit-forming means forms a plurality of pits according to the output of said encoding means, and forms synchronizing pits according to the output of said detecting means.

24. A camera for recording data on a film, comprising:

a shooting mechanism for exposing said film to an object image;

film feeding means for feeding said film;

detecting means for detecting a feeding state of the film;

encoding means for encoding data to be recorded on said film;

pit-forming means for forming shallow pits on said film, said pit-forming means abutting said film; and control means for controlling said pit-forming means to thereby control recording of encoded data onto said film according to an output of said detecting means and to an output of said encoding means while said film feeding means feeds said film.

25. A camera according to claim 24, wherein said pit-forming means comprises at least one of fine heating sections and an array of fine heating elements.

26. A camera according to claim 25, wherein said encoding means encodes recording data into data which includes a plurality of bits, and said control means controls said pit-forming means to form a plurality of fine pits on said film by controlling a thermal condition of said pit-forming means according to the output of said encoding means.

27. A camera according to claim 24, wherein said control means detects a predetermined position of said film according to the output of said detecting means and controls said pit-forming means to form a plurality of shallow pits on said predetermined position according to the output of said encoding means.

28. A camera according to claim 27, wherein said control means controls said pit-forming means to form a plurality of fine pits according to the output of said encoding means, and to form synchronizing pits according to the output of said detecting means.

29. A camera according to claim 24, wherein said pit-forming means is arranged in a back cover of said camera.

30. A camera according to claim 29, wherein at least one of a first back cover incorporating said pit-forming means and a second back cover not having said pit-forming means can be fitted to a camera main body of said camera, and wherein a set of contacts for relaying signals from the camera main body is commonly used for both said first back cover and said second back cover.

31. A camera according to claim 29, wherein the camera main body is provided with position defining means for defining a position of said pit-forming means, and said pit-forming means is provided with a member for engaging with said position defining means when the back cover is closed.

32. A data recording apparatus for a camera, comprising:

data writing means for writing data on a photographing film in the camera;

said data writing means including a thermal head for forming fine pits on the photographing film, thereby writing data on the photographing film; and control means for controlling writing of data in a data writing region of the film, and for controlling writing of correction data on a leading writing region of the film which precedes said data writing region, said leading writing region being a region for writing correction data on the film.

33. A data recording unit according to claim 32, wherein said thermal head performs a preliminary heating operation in said leading writing region.

* * * * *